(12) United States Patent
Numazaki et al.

(10) Patent No.: US 6,227,670 B1
(45) Date of Patent: May 8, 2001

(54) PROJECTION TYPE DISPLAY APPARATUS

(75) Inventors: Kiyoshi Numazaki; Yuji Manabe; Tetsuo Hattori, all of Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/374,993

(22) Filed: Aug. 16, 1999

Related U.S. Application Data

(63) Continuation-in-part of application No. 08/993,528, filed on Dec. 18, 1997, now Pat. No. 6,062,694, which is a continuation-in-part of application No. 08/611,555, filed on Mar. 6, 1996, now Pat. No. 5,808,795.

(30) Foreign Application Priority Data

| Mar. 6, 1995 | (JP) | 7-072372 |
| Jun. 9, 1995 | (JP) | 7-168298 |
| Oct. 28, 1997 | (JP) | 9-295914 |
| Oct. 1, 1998 | (JP) | 10-280166 |

(51) Int. Cl.[7] ................................. G03B 21/14
(52) U.S. Cl. ................... 353/31; 353/20; 349/9; 359/488
(58) Field of Search ................ 353/20, 31, 33, 353/34, 37, 81; 349/8, 9; 359/639, 640, 488, 495, 496, 500, 831, 834

(56) References Cited

U.S. PATENT DOCUMENTS

| 4,191,456 | 3/1980 | Hong et al. ............ 353/31 |
| 4,687,301 | 8/1987 | Ledebuhr ............... 359/634 |
| 4,969,730 | * 11/1990 | Van Den Brandt ...... 353/34 |
| 5,098,183 | 3/1992 | Sonehara ............... 353/33 |
| 5,172,254 | 12/1992 | Atarashi et al. ........ 353/20 |
| 5,357,370 | 10/1994 | Miyatake et al. ...... 359/495 |
| 5,453,859 | 9/1995 | Sannohe et al. ........ 349/9 |
| 5,459,592 | 10/1995 | Shibatani et al. ...... 349/5 |
| 5,576,854 | 11/1996 | Schmidt et al. ........ 349/5 |
| 5,653,520 | 8/1997 | Kato et al. ............. 353/33 |
| 5,716,122 | 2/1998 | Esaki et al. ............ 353/33 |
| 5,772,299 | 6/1998 | Koo et al. .............. 353/20 |
| 5,786,934 | * 7/1998 | Chiu et al. ............. 353/33 |
| 5,798,819 | 8/1998 | Hattori et al. .......... 353/33 |
| 5,808,795 | 9/1998 | Shimomura et al. .... 349/5 |
| 5,826,959 | 10/1998 | Atsuchi ................. 353/33 |

FOREIGN PATENT DOCUMENTS

| 61-84606 | 4/1986 | (JP) . |
| 61-141402 | 6/1986 | (JP) .............. G02B/5/30 |
| 62-012634 | 1/1987 | (JP) .............. C03C/3/07 |
| 62-12634 | 1/1987 | (JP) . |
| 3-284705 | 12/1991 | (JP) .............. G02B/5/30 |
| 5-157915 | 6/1993 | (JP) . |
| 7-215732 | 8/1995 | (JP) . |
| 7-218723 | 8/1995 | (JP) . |
| 7-294732 | 11/1995 | (JP) .............. G02B/5/30 |
| 8-21982 | 1/1996 | (JP) . |
| 8-5836 | 1/1996 | (JP) .............. G02B/5/30 |
| 9-54213 | 2/1997 | (JP) . |
| 10-118637 | 5/1998 | (JP) . |
| 10-142714 | 5/1998 | (JP) . |
| 95/21137 | 8/1995 | (WO) . |

* cited by examiner

*Primary Examiner*—William Dowling
(74) *Attorney, Agent, or Firm*—Foley & Lardner

(57) ABSTRACT

The projection type display apparatus according to the present invention has a prism for separating incident light into a plurality of light components and combining the plurality of modulated color components. The prism is constituted by a plurality of prism assemblies, each including an optical member made of an optically transparent material having a photoelastic constant whose absolute value is not greater than $+1.5 \times 10^{-8}$ cm$^2$/N with respect to the incident light. More preferably, these plurality of prism assemblies are arranged such that each of a plurality of the separated color components is totally reflected by any of the prism assemblies.

12 Claims, 10 Drawing Sheets

Fig.2

| SAMPLE No. | | 1 | 2 | 3 | 4 | 5 | 6 | 7 | 8 |
|---|---|---|---|---|---|---|---|---|---|
| COMPOSITION | SiO$_2$ (wt %) | 27.2 | 25.9 | 25.4 | 24.9 | 24.4 | 23.9 | 23.4 | 22.9 |
| | Na$_2$O (wt %) | 0.5 | 0.9 | 0.9 | 0.9 | 0.9 | 0.9 | 0.9 | 0.9 |
| | K$_2$O (wt %) | 1.0 | 0.9 | 0.9 | 0.9 | 0.9 | 0.9 | 0.9 | 0.9 |
| | PbO (wt%) | 71.0 | 72.0 | 72.5 | 73.0 | 73.5 | 74.0 | 74.5 | 75.0 |
| | As$_2$O$_3$ (wt %) | 0.3 | — | — | — | — | — | — | — |
| | Sb$_2$O$_3$ (wt %) | — | 0.3 | 0.3 | 0.3 | 0.3 | 0.3 | 0.3 | 0.3 |
| WAVELENGTH TO MINIMIZE ABSOLUTE VALUE OF PHOTOELASTIC CONSTANT (nm) | | 368 | 397 | 412 | 444 | 482 | 528 | 650 | 789 |

PROJECTION TYPE DISPLAY APPARATUS

RELATED APPLICATIONS

The application is a continuation-in-part of application Ser. No. 08/993,528, filed Dec. 18, 1997, now U.S. Pat. No. 6,062,694, which is in turn Continuation-In-Part of application Ser. No. 08/611,555, filed Mar. 6, 1996, now U.S. Pat. No. 5,808,795.

BACKGROUND OF THE INVENTION

1. Field of the Invention

The present invention relates to a projection type display apparatus utilizing a spatial light modulator (light valve), and more particularly, to a projection type display apparatus having the structure for securing optically stable performance against influence of external stress and effectively restricting image quality degradation of projection image.

2. Related Background Art

A known example of the spatial light modulator (light valve) conventionally used for projection type display apparatus is a spatial light modulator of a phase difference modulation type (polarization modulation type), which spatially modulating light, utilizing polarization. For example, a modulator formed using the liquid crystal (phase difference modulation type liquid crystal light valve) is practically available as the spatial light modulator of the phase difference modulation type.

The conventional projection type display apparatus using such a spatial light modulator of the phase difference modulation type uses a polarizing beam splitter (primary polarizing beam splitter) serving as a polarizer and an analyzer. For the below description, let us assume that the polarizing beam splitter has such a property as to reflect an s-polarized light component and transmit a p-polarized light component. In the conventional projection type display apparatus, the polarizing beam splitter splits light incident thereinto (light directly incident from an illumination light source or light after color-separated before incidence thereto) into light of the p-polarized light component and light of s-polarized light component, and normally, the s-polarized light component out of the light thus split into is projected to the spatial light modulator. After modulated and reflected by a liquid crystal layer of the spatial light modulator, the light again goes back into the polarizing beam splitter. On this occasion, the reflected light from the spatial light modulator 4 is analyzed by the polarizing beam splitter. The above polarizing beam splitter reflects the s-polarized light component, but transmits only the p-polarized light resulting from the modulation by the spatial light modulator. The transmitted light (that is, the analyzed light) is projected as a projection image through a projection optical system onto a screen or the like.

Many polarizing beam splitters and color separating/combining optical systems used in such projection type display apparatus have been proposed as liquid immersion type optical components in such structure that a plate of an optically transparent material coated with a coating for polarizing beam splitter and a plate of an optically transparent material coated with a color separating dichroic film were respectively immersed in a liquid with adjusted refractive index, as disclosed for example in U.S. Pat. No. 4,687,301 owned by Hughes Aircraft Co. The refractive index of the above liquid, at a predetermined temperature of the liquid, is adjusted so as to be equal to that of the plate of the transparent material. The reason why the beam splitter is immersed in the liquid is that, supposing the beam splitter were set in air, the interface of the coating would be in a relation of air against transparent material and the polarizing beam splitter would fail to function because of a difference in refractive index.

In the conventional projection type display apparatus, the light incident into the polarizing beam splitter is split by the polarizing beam splitter into the p-polarized light component and s-polarized light component, among which the s-polarized light component is projected to the color separating/combining optical system. After the color separating/combining optical system separates the incident s-polarized light component into some color components, the separated color components are respectively modulated by liquid crystal layers and respectively reflected by reflection layers of light valves which are prepared in accordance with the color components. The modified color components are combined by the color separating/combining optical system, and thereafter the combined light returns to and is analyzed by the polarizing beam splitter. The analyzed light is projected as a projection image through the projection optical system onto the screen or the like.

SUMMARY OF THE INVENTION

The inventors found out the following problems after investigation on the conventional projection type display apparatus employing the polarizing beam splitter and the color separating/combining optical system of the liquid immersion type as discussed above.

First, in the case of the above liquid immersion type polarizing beam splitter and the liquid immersion type color separating/combining optical system, a change of the refractive index of the liquid in which the plate of the transparent material is immersed depends upon a change of the temperature of the liquid. Namely, even with the liquid adjusted in its refractive index at a certain liquid temperature, the temperature change of the liquid itself will make a difference between the refractive index of the liquid and the refractive index of the plate of the transparent material. This changes the performances of the entire optical components. For example, in the case of a certain sample (the liquid for the above liquid immersion type optical components), the refractive index changes about 0.000349 per temperature rise of 1° C., and this change rate is two order greater than those of substrate materials for plates of normal transparent materials. Normally, use environments (for example, temperatures) of the projection type display apparatus include a possibility of change of about 20° C. to 60° C., so that the difference in refractive index becomes unignorable. Since dispersion also changes, it causes chromatic aberration and chromatic unevenness in the projection image.

Second, in the case of the above liquid immersion type polarizing beam splitter and the liquid immersion type color separating/combining optical system, if the temperature change in the liquid is not even, the temperature dependence of the refractive index of the liquid as discussed above will affect the evenness of the refractive index of the liquid, thereby forming an index distribution in the liquid. In practical projection type display apparatus, the liquid temperature rarely changes evenly over the entire liquid (whereby the refractive index of the entire liquid is not even), which will be a great cause to damage the evenness of the projection image.

Third, in the case of the liquid immersion type polarizing beam splitter and the liquid immersion type color separating/combining optical system, the above uneven temperature change of the liquid destroys the evenness of the density of the liquid as well as that of the refractive index of the liquid as discussed above, resulting in causing convection in the liquid. Since this convection causes a time change of the uneven index distribution in the liquid as described above, the occurrence of convection will be a cause to change the unevenness of picture quality with time in the projection type display apparatus.

Fourth, in the above liquid immersion type polarizing beam splitter and the liquid immersion type color separating/combining optical system, the volume of the liquid itself also changes with a change of the liquid temperature. In the case of the above sample, the temperature change of 1° C. changes the volume at 0.00073 cc per cc. The use environments (for example, the temperatures) of the projection type display apparatus cover a temperature difference of about 40° C., but, considering transportation and storage in warehouse, it is necessary to take account of the temperature range of approximately −10° C. to 80° C. Although the volume change itself of the liquid gives a small effect on the projection image, some mechanism is needed for absorbing the volume change of the liquid because of the configuration of the apparatus.

Fifth, if there is dust in the liquid of the above liquid immersion type polarizing beam splitter and the liquid immersion type color separating/combining optical system, the projection type display apparatus employing the liquid immersion type optical components will indicate the dust in the liquid in the projection image enlarged some ten to some hundred times, even if the dust in the liquid is not located near the focal point. Considering this situation, there should exist no dust in the liquid. Accordingly, assembling of the above liquid immersion type polarizing beam splitter requires a clean room and a work for removing dust and foreign matter in the liquid therefrom.

Sixth, if a bubble exists in the liquid in the above liquid immersion type polarizing beam splitter and the liquid immersion type color separating/combining optical system, the bubble will appear in the projection image, and thus, it should be preliminarily removed.

Seventh, because the above liquid immersion type polarizing beam splitter and the liquid immersion type color separating/combining optical system use the liquid because of its structure, it is necessary to provide a case for housing the liquid with a means for preventing leakage of the liquid, such as an O-ring.

As discussed above, the liquid immersion type polarizing beam splitter and the liquid immersion type color separating/combining optical system have a lot of problems because of its structural feature or the like, and the projection type display apparatus employing it naturally requires a lot of time and labor for production thereof, which results in increasing the cost. Particularly, the characteristic changes of the refractive index etc. due to the liquid temperature change of the liquid are substantially unavoidable problems. Since the liquid immersion type polarizing beam splitter cannot be set at the setting angle of 45° relative to the optical axis because of the refractive index, the projection type display apparatus employing the polarizing beam splitter becomes large and heavy.

Moreover, in the case of the conventional polarizing beam splitter and color separating/combining optical system each being constructed by a block of the transparent material, optical anisotropy of glass caused by various factors induces double refraction, which could disturb the optical characteristics of the optical components, possibly resulting in failing to fully reduce the image quality degradation of the projection image. Here, the various factors mainly include processing steps of the transparent material (cutting, bonding with another material, and film formation on surface), external stress caused in the operation of incorporating the transparent material into the optical-system (holding with a jig, adhesion, etc.), thermal stress caused by heat generation inside the transparent material (absorption of light energy etc.) or external heat generation (heat generation of peripheral devices etc.), and stress caused when the transparent material is bonded in contact with another material of a different thermal expansion coefficient during heat generation. As described, these various thermal stress and external stress occurs throughout the period ranging from fabrication of the transparent material block and processing of the optical components to the operating duration of the projection type display apparatus, and it is thus very difficult to eliminate the all factors.

The present invention has been accomplished to solve the above problems, and an object of the invention is to provide a projection type display apparatus which employs a polarizing beam splitter and a color separating/combining optical system each being constructed of a transparent material block (solid material), thereby removing the various problems resulting from employment of the above-discussed liquid immersion type polarizing beam splitter, being capable of securing optically stable performance against the influence of various thermal stress and external stress in the transparent material block, and decreasing the degradation of image quality.

The projection type display apparatus according to the present invention is a display apparatus for effecting, at least, color separation, polarized light separation, and color combination with respect to light from a light source. The apparatus mainly encompasses a configuration in which, after color separation, each light component is subjected to polarized light separation; and a configuration in which, after polarized light separation, thus separated light beam is divided into individual color light components.

First, in the configuration in which each light component obtained after color separation is subjected to polarized light separation, the projection type display apparatus according to the present invention comprises, at least, a color separating optical system for separating light from a light source into red, green, and blue light components; a polarized light separating optical system for separating an incident light component into polarized light components different from each other; a light valve (spatial light modulator) for modulating a light component; a color combining optical system for combining a plurality of incident light components in terms of color; and a projection optical system for projecting light resulting from color combination effected by the color combining optical system onto a predetermined screen or the like.

Also, the projection type display apparatus according to the present invention comprises a first optical system disposed so as to correspond to the red light component resulting from color separation effected by the color separating optical system, a second optical system disposed so as to correspond to the green light component, and a third optical system disposed so as to correspond to the blue light component. Here, the blue light component (hereinafter referred to as "B-light component") refers to light in a wavelength range of 380 to 500 nm, the green light component (hereinafter referred to as "G-light component") refers to light in a wavelength range of 500 to 600 nm, and the red light component (hereinafter referred to as "R-light component") refers to light in a wavelength range of 600 to 700 nm.

The first optical system comprises a first polarized light separating optical system for emitting a first polarized light component according to the R-light component incident thereon; a first light valve for modulating the first polarized light component emitted from the first polarized light separating optical system; and a first analyzing optical system for analyzing the first polarized light component modulated by the first light valve. The second optical system comprises a second polarized light separating optical system for emitting a second polarized light component according to the G-light component incident thereon; a second light valve for modulating the second polarized light component emitted from the second polarized light separating optical system; and a second analyzing optical system for analyzing the second polarized light component modulated by the second light valve. The third optical system comprises a third polarized light separating optical system for emitting a third polarized light component according to the B-light component incident thereon; a third light valve for modulating the third polarized light component emitted from the third polarized light separating optical system; and a third analyzing optical system for analyzing the third polarized light component modulated by the third light valve.

Here, in the projection type display apparatus according to the present invention, the first to third polarized light separating optical systems may be constituted by first to third polarizing beam splitters, respectively. Also, the first to third analyzing optical systems may be constituted by the first to third polarizing beam splitters, respectively. Further, the apparatus may be configured such that the pairs of the polarized light separating optical system and analyzing optical system for the R-light component, the polarized light separating optical system and analyzing optical system for the G-light component, and the polarized light separating optical system and analyzing optical system for the B-light component commonly use their corresponding polarizing beam splitters (first to third polarizing beam splitters) provided for the respective light components.

In particular, in the above-mentioned configuration, the optical member constituting the polarizing beam splitters is preferably made of an optically transparent material in which a wavelength where the absolute value of its photoelastic constant becomes a minimum level exists in the wavelength range of at least one of the B-light component and G-light component. Alternatively, this optical member is preferably made of an optically transparent material in which, among a first value which is a mean value of absolute values of photoelastic constants with respect to individual wavelengths in the wavelength range of the R-light component, a second value which is a mean value of absolute values of photoelastic constants with respect to individual wavelengths in the wavelength range of the G-light component, and a third value which is a mean value of absolute values of photoelastic constants with respect to individual wavelengths in the wavelength range of the B-light component, the second or third value is the smallest. Specifically, the optically transparent material is preferably a material in which the photoelastic constant with respect to each wavelength in the wavelength range of the R-light component, at least, is not greater than $+1.5 \times 10^{-8}$ cm$^2$/N.

On the other hand, in the configuration in which color separation is effected after light from a light source is subjected to polarized light separation, the projection type display apparatus according to the present invention comprises, at least, a polarized light separating optical system for separating the light from the light source into polarized light components different from each other; a color separating optical system for separating a predetermined polarized light component incident thereon into red, green, and blue light components; a light valve for modulating a light component incident thereon; a color combining optical system for combining a plurality of incident light components in terms of color; and a projection optical system for projecting light resulting from color combination effected by the color combining optical system onto a predetermined screen or the like.

Also, the projection type display apparatus according to the present invention comprises a first optical system disposed so as to correspond to the red light component resulting from color separation effected by the color separating optical system, a second optical system disposed so as to correspond to the green light component, and a third optical system disposed so as to correspond to the blue light component.

The first optical system comprises a first light valve for modulating the R-light component incident thereon, and a first analyzing optical system for analyzing the polarized light component modulated by the first light valve. The second optical system comprises a second light valve for modulating the G-light component incident thereon, and a second analyzing optical system for analyzing the polarized light component modulated by the second light valve. The third optical system comprises a third light valve for modulating the B-light component incident thereon, and a third analyzing optical system for analyzing the polarized light component modulated by the third light valve.

Here, in the projection type display apparatus according to the present invention, the polarized light separating optical system may be constituted by a polarizing beam splitter. In this configuration, in particular, the optical member constituting the polarizing beam splitter is preferably made of an optically transparent material in which a wavelength where the absolute value of its photoelastic constant becomes a minimum level exists in the wavelength range of at least one of the B-light component and the G-light component. Alternatively, this optical member is preferably made of an optically transparent material in which, among a first value which is a mean value of absolute values of photoelastic constants with respect to individual wavelengths in the wavelength range of the R-light component, a second value which is a mean value of absolute values of photoelastic constants with respect to individual wavelengths in the wavelength range of the G-light component, and a third value which is a mean value of absolute values of photoelastic constants with respect to individual wavelengths in the wavelength range of the B-light component, the second or third value is the smallest. Specifically, the optically transparent material is preferably a material in which the photoelastic constant with respect to each wavelength in the wavelength range of the R-light component, at least, is not greater than $+1.5 \times 10^{-8}$ cm$^2$/N.

Also, the first to third analyzing optical systems may be constituted by first to third polarizing beam splitters, respectively. In this configuration, in particular, the optical member constituting the polarizing beam splitters is preferably made of an optically transparent material in which a wavelength where the absolute value of its photoelastic constant becomes a minimum level exists in the wavelength range of at least one of the B-light component and the G-light component. Alternatively, this optical member is preferably made of an optically transparent material in which, among a first value which is a mean value of absolute values of photoelastic constants with respect to individual wavelengths in the wavelength range of the R-light component, a second value which is a mean value of absolute values of photoelastic constants with respect to individual wavelengths in the wavelength range of the G-light component, and a third value which is a mean value of absolute values of photoelastic constants with respect to individual wavelengths in the wavelength range of the B-light component, the second or third value is the smallest. Specifically, the optically transparent material is preferably a material in which the photoelastic constant with respect to each wavelength in the wavelength range of the R-light component, at least, is not greater than $+1.5\times10^{-8}$ cm$^2$/N.

Additionally, the color separating optical system and the color combining optical system are preferably constituted by a common optical system. The common optical system is constituted by a plurality of prism assemblies, and the each of the plurality of prism assemblies is preferably made of an optically transparent material in which a wavelength where the absolute value of its photoelastic constant becomes a minimum level exists in the wavelength range of at least one of the B-light component and the G-light component. Alternatively, each of the plurality of prism assemblies is preferably made of an optically transparent material in which, among a first value which is a mean value of absolute values of photoelastic constants with respect to individual wavelengths in the wavelength range of the R-light component, a second value which is a mean value of absolute values of photoelastic constants with respect to individual wavelengths in the wavelength range of the G-light component, and a third value which is a mean value of absolute values of photoelastic constants with respect to individual wavelengths in the wavelength range of the B-light component, the second or third value is the smallest. Specifically, the optically transparent material is preferably a material in which the photoelastic constant with respect to each wavelength in the wavelength range of the R-light component, at least, is not greater than $+1.5\times10^{-8}$ cm$^2$/N.

The inventors have discovered that the photoelastic constant of an optically transparent material such as glass has a characteristic, as a function of wavelength, which is upward to the right (the longer the wavelength is, the higher becomes the photoelastic constant) while yielding an upward convex profile. The inventors have also discovered that, by changing the composition of the optically transparent material, the wavelength at which the absolute value of photoelastic constant becomes a minimum level can be changed while such a characteristic is maintained. Further, the smaller the absolute value of photoelastic constant is, the less occurs birefringence with respect to influences of various thermal and external stresses, whereby optically stable performances can be secured. Accordingly, when a polarizing beam splitter constituted by an optically transparent material having a small absolute value of photoelastic constant is used in a projection type display apparatus, the image quality of the projected image can be restrained from deteriorating. Here, the inventors have discovered that, in order to restrain the image quality from deteriorating, while the absolute value of photoelastic constant is preferably made smaller as the wavelength of light decreases, it is not necessary for the absolute value of photoelastic constant to be so small with respect to light having a long wavelength. It is due to the fact that, while an optically transparent material absorbs light and generates heat, thereby expanding itself according to its coefficient of linear expansion and generating an internal stress, such absorption becomes smaller as the wavelength of light is longer, whereby the longer the wavelength of light is, the less occurs the internal stress upon light absorption.

The present invention is based on these new discoveries achieved by the inventors.

The above-mentioned projection type display apparatus according to the present invention employs a polarizing beam splitter constituted by an optical member made of an optically transparent material, without using the above-mentioned conventional liquid immersion type polarizing beam splitter. Accordingly, the present invention can eliminate various problems accompanying the use of the above-mentioned conventional liquid immersion type polarizing beam splitter, thus advantageously facilitating the manufacture of the apparatus, for example.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a table showing results of measurement, for a plurality of samples having composition ratios different from each other, concerning wavelengths at which absolute values of their photoelastic constants are minimized;

DESCRIPTION OF THE PREFERRED EMBODIMENTS

In the following, embodiments of the projection type display apparatus according to the present invention will be explained with reference to FIGS. 1 to 10.

Embodiment 1

First, the configuration of the first embodiment of the projection type display apparatus according to the present invention will be explained with reference to FIGS. 1 to 4.

Figure 1:
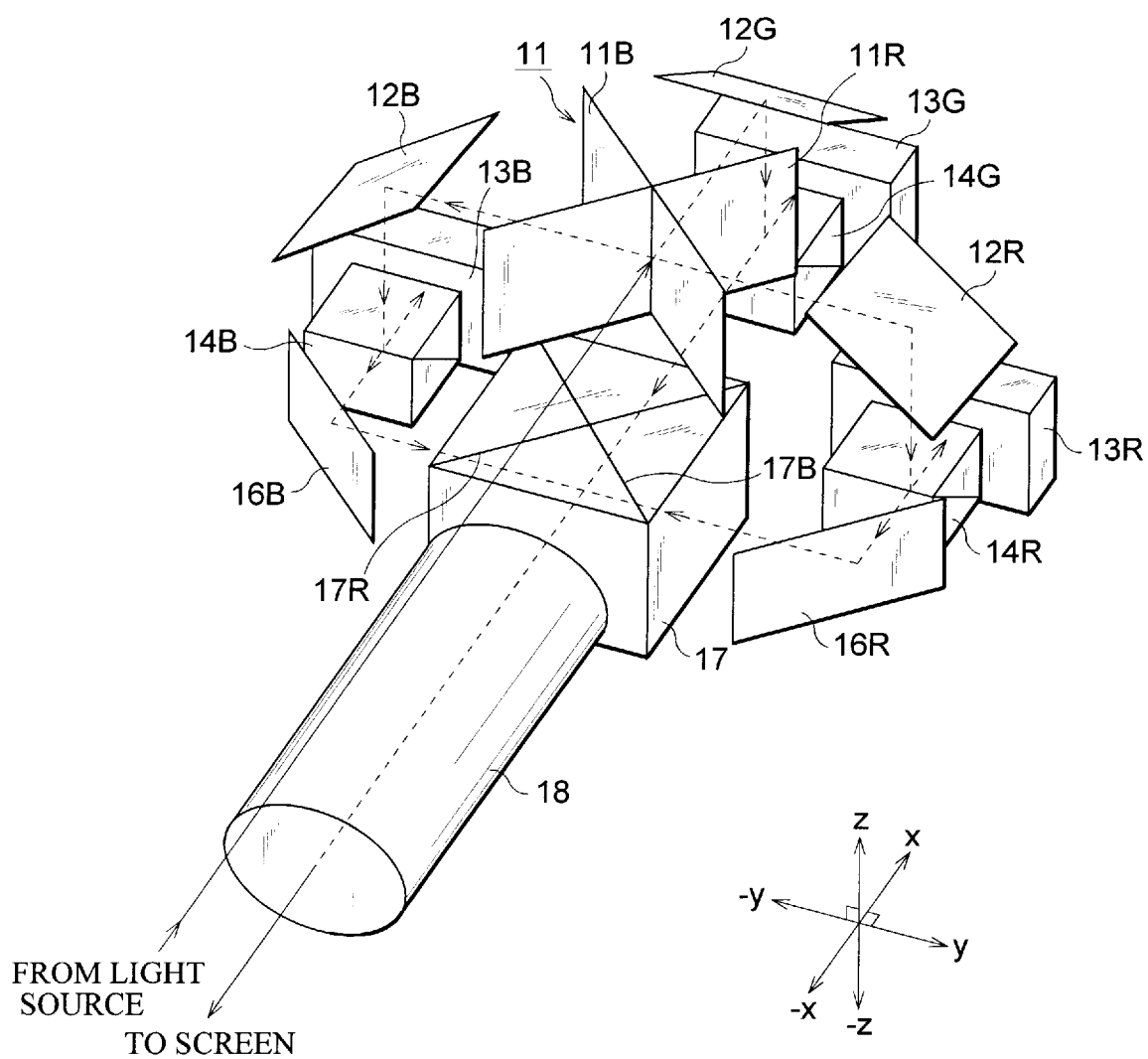
FIG. 1 is a perspective view schematically showing the configuration of the first embodiment of the projection type display apparatus according to the present invention.

FIG. 1 is a perspective view showing a schematic configuration of the first embodiment of the projection type display apparatus according to the present invention. For convenience of explanation, X, Y, and Z axes, which are orthogonal to each other, are defined as shown in the drawing (the definition being the same in FIGS. 5 to 7 which will be explained later).

In the projection type display apparatus of this embodiment, a light source is constituted by a lamp and a concave mirror such as an ellipsoidal mirror disposed on the back side of the lamp. A light source beam emitted from the light source is transmitted through an infrared cut filter and an ultraviolet cut filter, and then is converted into a substantially parallel luminous flux by a shaping optical system so as to advance along X axis, thereby being made incident on a cross dichroic mirror 11 which serves as a color separating optical system. The cross dichroic mirror 11 is configured such that a dichroic mirror 11B having a characteristic for reflecting a B-light component and a dichroic mirror 11R having a characteristic for reflecting an R-light component are disposed in X form so as to be orthogonal to each other. The light incident on the cross dichroic mirror 11 is separated into a B-light component (blue light beam) which is reflected by the dichroic mirror 11B so as to advance toward a bending mirror 12B along Y axis, an R-light component (red light beam) which is reflected by the dichroic mirror 11R so as to advance toward a bending mirror 12R along Y axis, and a G-light component (green light beam) passing through the dichroic mirrors 11B and 11R so as to directly advance toward a bending mirror 12G along X axis. The optical axes of thus separated color light components are changed by their corresponding bending mirrors 12R, 12G, and 12B so as to align with Z axis, whereby these light components are made incident on first to third polarizing beam splitters 14R, 14G, and 14B, each serving as both polarized light separating optical system and analyzing optical system, respectively prepared for the R, G, and B-light components. Each of the polarizing beam splitters 14R, 14G, and 14B is configured such that two rectangular prisms made of a glass constituting member as an optically transparent material are cemented together with a polarized light separating film made of a dielectric multilayer film or the like interposed therebetween. The polarized light separating films of the polarizing beam splitters 14R, 14G, and 14B are oriented in the same direction, whereby the separated R-, G-, and B-light components are made incident on the respective polarizing beam splitters 14R, 14G, and 14B along Z axis, and each color light component is separated into a p-polarized light component, which is transmitted through its corresponding polarized light separating film so as to be discarded, and an s-polarized light component, which is reflected by the polarized light separating film so as to be emitted along X axis. Namely, the polarizing beam splitter 14R emits a first polarized light component (s-polarized light) along X axis according to the incident R-light component, the polarizing beam splitter 14G emits a second polarized light component (s-polarized light) along X axis according to the incident G-light component, and the polarizing beam splitter 14B emits a third polarized light component (s-polarized light) along X axis according to the incident B-light component.

In the vicinity of exit surfaces for the s-polarized light components in the polarizing beam splitters 14R, 14G, and 14B for the respective color light components (R-, G-, and B-light components), light valves 13R, 13G, and 13B are respectively disposed as spatial light modulators, whereby the s-polarized light components of the respective colors emitted from the polarizing beam splitters 14R, 14G, and 14B for the respective color light components are made incident on their corresponding light valves 13R, 13G, and 13B. Employed as each of the light valves 13R, 13G, and 13B in this embodiment is an optical writing type reflection liquid crystal light valve which is a phase difference modulation type spatial light modulator.

Here, the configuration and function of an optical writing type reflection liquid crystal light valve will be explained. For example, this light valve is constituted, successively from the incident light side, by a transparent glass substrate, an ITO transparent electrode film, a liquid crystal alignment layer, a TN liquid crystal layer, a liquid crystal alignment layer, a dielectric reflecting mirror layer, a light shielding layer, a photoconductor layer made of a hydrogenated noncrystalline silicon layer or the like, an ITO transparent electrode layer, and a transparent glass substrate. Namely, when a writing optical signal is made incident on a side opposite to incident light, the photoconductor layer lowers its impedance at this position. Here, since an alternating current is always applied between both ITO electrodes so as to actuate this device, the supplied voltage is applied between liquid crystals. Accordingly, liquid crystal molecules align with each other in the direction of the resulting electric field, whereby the liquid crystal layer itself functions as a quarter wavelength plate. When there is no writing optical signal, by contrast, since the photoconductor layer at the above-mentioned position has a high impedance, the voltage applied between the ITO electrodes is not efficiently imparted to the liquid crystals. Accordingly, the liquid crystal molecules in the liquid crystal layer do not align with each other but are arranged in conformity to the liquid crystal alignment layers, thus forming a twisted structure. Due to the foregoing function, at the position where the writing optical signal is incident, incident linearly polarized light (reading light) passes through the liquid crystal layer so as to become circularly polarized light, which is then reflected by the mirror layer and passes through the liquid crystal layer again so as to be emitted therefrom with a direction of polarization changed by 90 degrees from that at the time of incidence. Namely, in the case where the incident light (reading light) is an s-polarized light component, it is emitted as a p-polarized light component. At the position where no writing optical signal is incident, the incident polarized light component is optically rotated according to the twist of liquid crystal molecules and is reflected by the reflecting layer so as to be optically rotated again according to the twist, thus being emitted with the same polarization as that of the incident light. That is, when the incident light (reading light) is an s-polarized light component, it is emitted as the s-polarized light component.

The foregoing is the configuration and function of the optical writing type reflection light valve. Of course, without being restricted to such an optical writing type reflection light valve, an electric writing type reflection light valve, for example, can also be employed as the light valve used in the present invention. The electric writing type reflection light valve has a function to selectively perform switching at every pixel by switching elements such as TFT or the like, thereby the light component incident on the selected pixel is polarized and emitted therefrom as in the case of the optical writing type reflection light valve. This case can contribute to reducing the size of the apparatus since no writing optical system is necessary.

The s-polarized light components of respective colors incident on their corresponding light valves 13R, 13G, and 13B are modulated by the latter according to their writing optical signals. Thus modulated light beams of the respective colors are emitted along X axis so as to be made incident on their corresponding polarizing beam splitters 14R, 14G, and 14B again. As can be seen from the above-mentioned principle of the optical writing type reflection light valve, the modulated light beam of each color includes a mixture of the p-polarized light component (signal component) at the position selected by the writing optical signal and the s-polarized light component at the position not selected thereby. Of the modulated light beams of respective colors incident on the polarizing beam splitters 14R, 14G, and 14B from their corresponding light valves 13R, 13G, and 13B, only the p-polarized light components (signal components) are transmitted through the respective polarized light separating films of the polarizing beam splitters 14R, 14G, and 14B so as to be emitted therefrom along X axis, whereas the s-polarized light components are reflected by these polarized light separating films along Z axis so as to be discarded. Namely, the modulated light beams of respective colors emitted from the light valves 13R, 13G, and 13B are respectively analyzed by the polarizing beam splitters 14R, 14G, and 14B, whereby only the p-polarized light components of the modulated light beams of respective colors are emitted from their corresponding polarizing beam splitters 14R, 14G, and 14B along X axis as analyzed light beams of respective colors.

The optical axes of analyzed light beams of R- and B-light components are respectively changed by bending mirrors 16R and 16B so as to align with Y axis, whereby these beams are made incident on a cross dichroic prism 17 which constitutes a color combining optical system. The analyzed light beam of G-light component directly advances along X axis so as to be made incident on the cross dichroic prism 17. The cross dichroic prism 17 is configured such that four pieces of optically transparent prisms each having a rectangular equilateral triangular prism form are cemented together with their rectangular portions butting together, while a dichroic film 17R for reflecting the R-light component and a dichroic film 17B for reflecting the B-light component are interposed between their butting surfaces so as to be placed in X form.

The analyzed light beam of G-light component incident on the dichroic prism 17 along X axis is transmitted through the dichroic films 17R and 17B so as to be directly emitted along X axis. The analyzed light beam of R-light component incident on the dichroic prism 17 along Y axis is reflected by the dichroic film 17R so as to be similarly emitted along X axis. The analyzed light beam of B-light component incident on the dichroic prism 17 along Y axis is reflected by the dichroic film 17B so as to be similarly emitted along X axis.

The above-mentioned analyzed light beams of respective colors are thus combined together by the cross dichroic prism 17 so as to be emitted toward a screen along X axis, thereby being projected onto the screen as a full-color projection image by a projection lens 18 serving as a projection optical system.

In the first embodiment, each of the polarizing beam splitters 14R, 14G, and 14B is constituted by an optical member (corresponding to the above-mentioned rectangular prism) made of an optically transparent material in which a wavelength where the absolute value of its photoelastic constant becomes a minimum level exists in the wavelength range of the B-light component. Each of the polarizing beam splitters 14R, 14G, and 14B may also be constituted by an optical member (corresponding to the above-mentioned rectangular prism) made of an optically transparent material in which, among a first value which is a mean value of absolute values of photoelastic constants with respect to individual wavelengths in the wavelength range of the R-light component, a second value which is a mean value of absolute values of photoelastic constants with respect to individual wavelengths in the wavelength range of the G-light component, and a third value which is a mean value of absolute values of photoelastic constants with respect to individual wavelengths in the wavelength range of the B-light component, the second or third value is the smallest.

In the following, optically transparent materials suitable for an optical member constituting a polarizing beam splitter will be explained.

In general, when a force is exerted on an isotropic and homogenous optically transparent material such as glass to generate a stress, optical anisotropy occurs in this optically transparent material, thus yielding birefringence as in the case of a certain kind of crystal. Such phenomenon is known as photoelastic effect. The refractive index of the optically transparent material when the stress occurs therein can be expressed by an index ellipsoid, whose principal refractive index axis coincides with the principal stress axis. In general, assuming that principal refractive indices are $n_1$, $n_2$, and $n_3$, and that principal stresses are $\sigma_1$, $\sigma_2$, and $\sigma_3$ (wherein those with suffixes identical to each other exist in directions identical to each other); relationships of the following expressions are established therebetween:

$$n_1 = n_0 + C_1\sigma_1 + C_2(\sigma_2 + \sigma_3) \qquad (1)$$

$$n_2 = n_0 + C_1\sigma_2 + C_2(\sigma_3 + \sigma_1) \qquad (2)$$

$$n_3 = n_0 + C_1\sigma_3 + C_2(\sigma_1 + \sigma_2) \qquad (3)$$

wherein $C_1$ and $C_2$ are constants specific to a light wavelength and an optically transparent material, and $n_0$ is a refractive index under no stress.

In the case where light is made incident on such an optically transparent material, when coordinates are established such that the direction of the incident light aligns with $\sigma_3$, the incident light splits into two linearly polarized light components respectively existing in $\sigma_1$ and $\sigma_2$ directions, i.e., having planes of vibration orthogonal to each other. When light is emitted from this optically transparent material, since the refractive indices ($n_1$ and $n_2$) of the respective principal stress directions differ from each other, an optical path difference (phase difference) $\Delta\Phi$ is generated between the two linearly polarized light components, as represented by the following expression:

$$\begin{aligned}\Delta\Phi &= (2\pi/\lambda) \times (n_1 - n_2) \times l \qquad (4)\\ &= (2\pi/\lambda) \times (C_1 - C_2) \times (\sigma_2 - \sigma_1) \times l\\ &= (2\pi/\lambda) \times C \times (\sigma_2 - \sigma_1) \times l\end{aligned}$$

wherein $\lambda$ is a wavelength of light, $l$ is a light transmission thickness of the optically transparent material, and $C=(C_1-C_2)$, which is known as a photoelastic constant, indicates a magnitude of birefringence generated by a stress (i.e., amount of birefringence per unit stress).

The inventors prepared glass samples with various compositions as optically transparent materials for a polarizing beam splitter, measured their birefringence values by using linearly polarized monochromatic light beams of various wavelengths in a state where a known stress was applied to the samples in a direction where $\sigma_2 = \sigma_3 = 0$, and computed the photoelastic constant C of each sample from the above-mentioned expressions (1) to (4). The ranges of compositions of the prepared glass samples were as follows in terms of % by weight based on oxides:

| | |
|---|---|
| $SiO_2$ | 17.0 to 29.0% |
| $LiO_2 + Na_2O + K_2O$ | 0.5 to 5.0% |
| PbO | 70.0 to 75.0% |
| $As_2O_3 + Sb_2O_3$ | 0 to 3.0% |

The composition ranges of respective components were set as listed above due to the following reasons.

Among the above-mentioned components, PbO (lead oxide) is used for controlling the value of photoelastic constant C by utilizing the fact that the value of photoelastic constant C in a glass composition containing PbO greatly depends on the PbO content. It is presumed that the value of photoelastic constant C changes according to the PbO content since the state of coordination of lead ions changes as the content increases.

$SiO_2$ is used as an optical glass forming oxide for the glass samples, and each glass sample preferably contains at least 17% by weight of this component. Nevertheless, its upper limit is set to 29% by weight since the PbO content is restricted as mentioned above.

At least 0.5% by weight of alkali metal components such as $LiO_2+Na_2O+K_2O$ are preferably contained since they are effective in decreasing the glass melting temperature and glass transition temperature and enhancing the stability of glass against devitrification. Nevertheless, the content thereof should preferably be kept from exceeding 5% by weight, otherwise the chemical durability of the glass may be lost.

$As_2O_3$, $Sb_2O_3$, or $(As_2O_3+Sb_2O_3)$, which is to be employed as a defoaming agent, may be mixed into raw materials of glass when necessary. The content thereof should preferably be kept from exceeding 3% by weight, otherwise the devitrification resistance and spectral transmittance of the glass may be lost.

FIG. 2 shows a part of results of measurement conducted as mentioned above. The table of FIG. 2 lists compositions of glass samples No. 1 to No. 8, and wavelengths where the absolute values of photoelastic constants C of the glass samples are minimized (i.e., substantially nullified).

Each of these glass samples was produced by the following process. Namely, oxides, fluorides, hydroxides, carbonates, nitrates, and the like were prepared as raw materials corresponding to the individual components listed in the table; they were weighed and mixed in predetermined ratios so as to yield raw composition materials; thus yielded raw composition materials were heated to a temperature of 900° to 1,300° C., at which they were melted, clarified, and stirred in an electric furnace so as to be homogenized; and thus homogenized mixture was cast into a preheated casting mold and then was annealed. Thus produced glass compositions were ground and polished to prepare the glass samples No. 1 to No. 8 as samples for measuring the photoelastic constant C.

Figure 3:
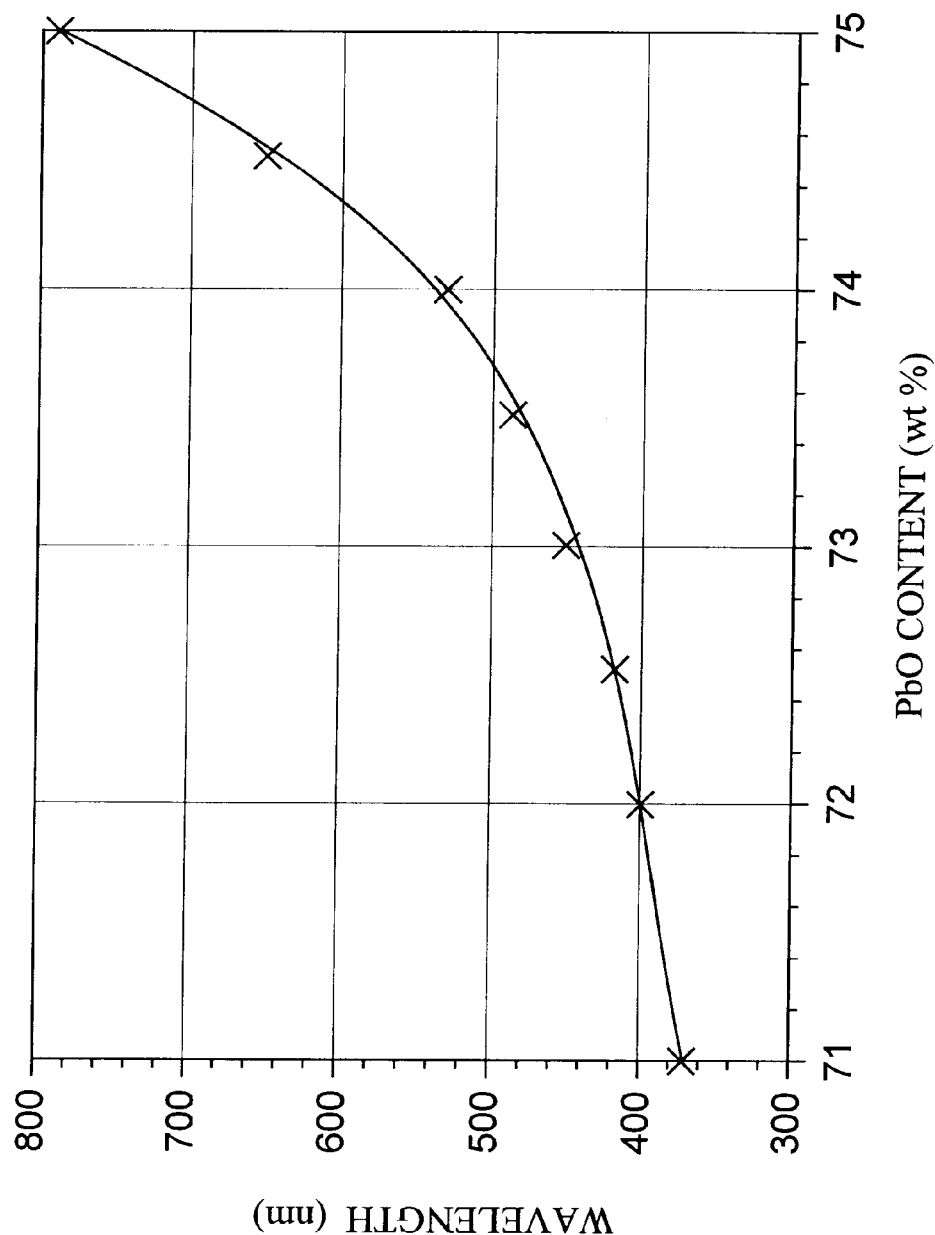
FIG. 3 is a graph showing a relationship between the content of PbO in the composition of an optical member (glass) used in a polarizing beam splitter and the wavelength at which the absolute value of photoelastic constant of the glass is minimized.

From the results of measurement shown in the table of FIG. 2, i.e., those concerning the light wavelength at which the absolute value of photoelastic constant C is minimized, it can be seen that, in the glass within the above-mentioned composition range, there is a correlation shown in FIG. 3 between the PbO content in the glass composition and the wavelength at which the absolute value of its photoelastic constant is minimized. Here, the curve in FIG. 3 is obtained when the PbO content within the range of 71 wt % to 75 wt % is fitted to a cubic polynomial. Accordingly, it has been found that the light wavelength at which the absolute value of photoelastic constant C is minimized can be controlled in the composition within the range shown in FIG. 3 when the PbO content therein is controlled. It can be seen from FIG. 3 that, for example, in order to minimize the absolute value of photoelastic constant C in the wavelength range of the B-light component, i.e., 380 to 500 nm, the PbO content should be set within the range of 71.0 wt % to 73.7 wt %.

On the other hand, the inventors prepared three kinds of polarizing beam splitters and, from the results of their evaluation, have reached a conclusion that the absolute value of photoelastic constant of the optically transparent material used in a polarizing beam splitter with respect to the wavelength of incident light is preferably $+1.5 \times 10^{-8}$ cm$^2$/N or less. Namely, as the three kinds of polarizing beam splitters, prepared were (1) the one constituted by a member made of glass having a composition within the above-mentioned composition range and made by the above-mentioned process, in which the absolute value of photoelastic constant of the glass with respect to a green monochromatic light beam having a predetermined wavelength was not greater than $0.01 \times 10^{-8}$ cm$^2$/N; (2) the one constituted by a member made of glass whose absolute value of photoelastic constant with respect to the above-mentioned green monochromatic light beam was $1.33 \times 10^{-8}$ cm$^2$/N; and (3) the one constituted by a member made of glass whose absolute value of photoelastic constant with respect to the above-mentioned green monochromatic light beam was $2.0 \times 10^{-8}$ cm$^2$/N. Then, an s-polarized green light beam was made incident on each polarizing beam splitter, the light beam reflected by and emitted from the polarizing beam splitter was reflected by a mirror so as to be made incident on the polarizing beam splitter again, and the light beam reflected by the mirror and transmitted through the polarizing beam splitter was projected onto a screen, on which illuminance unevenness was evaluated. As a result, the illuminance unevenness occurred very little in the polarizing beam splitter (1); the illuminance unevenness was visible but practically tolerable in the polarizing beam splitter (2); and the illuminance unevenness was remarkably observed in the polarizing beam splitter (3). From these results of-evaluation, it can be seen that, when a member made of an optically transparent material in which the absolute value of photoelastic constant with respect to incident light does not exceed $+1.5 \times 10^{-8}$ cm$^2$/N (i.e., at least $-1.5 \times 10^{-8}$ cm$^2$/N but not greater than $+1.5 \times 10^{-8}$ cm$^2$/N) is used for a polarizing beam splitter employed in the projection type display apparatus, it is possible to attain a projection type display apparatus capable of fully securing optically stable performances and fully restraining the projection image from deteriorating its quality, as compared with the conventional optically transparent material members (e.g., BK7 whose photoelastic constant is $2.78 \times 10^{-8}$ cm$^2$/N).

Additionally, the above-mentioned effects can be obtained by a color separating/combining optical system utilizing a plurality of triangular prisms as well as a polarizing beam splitter constituted by the prism assemblies of optically transparent material. Also, an optically transparent material of the triangular prism is preferable that its photoelastic constant C is set within the above-mentioned range.

Figure 4:
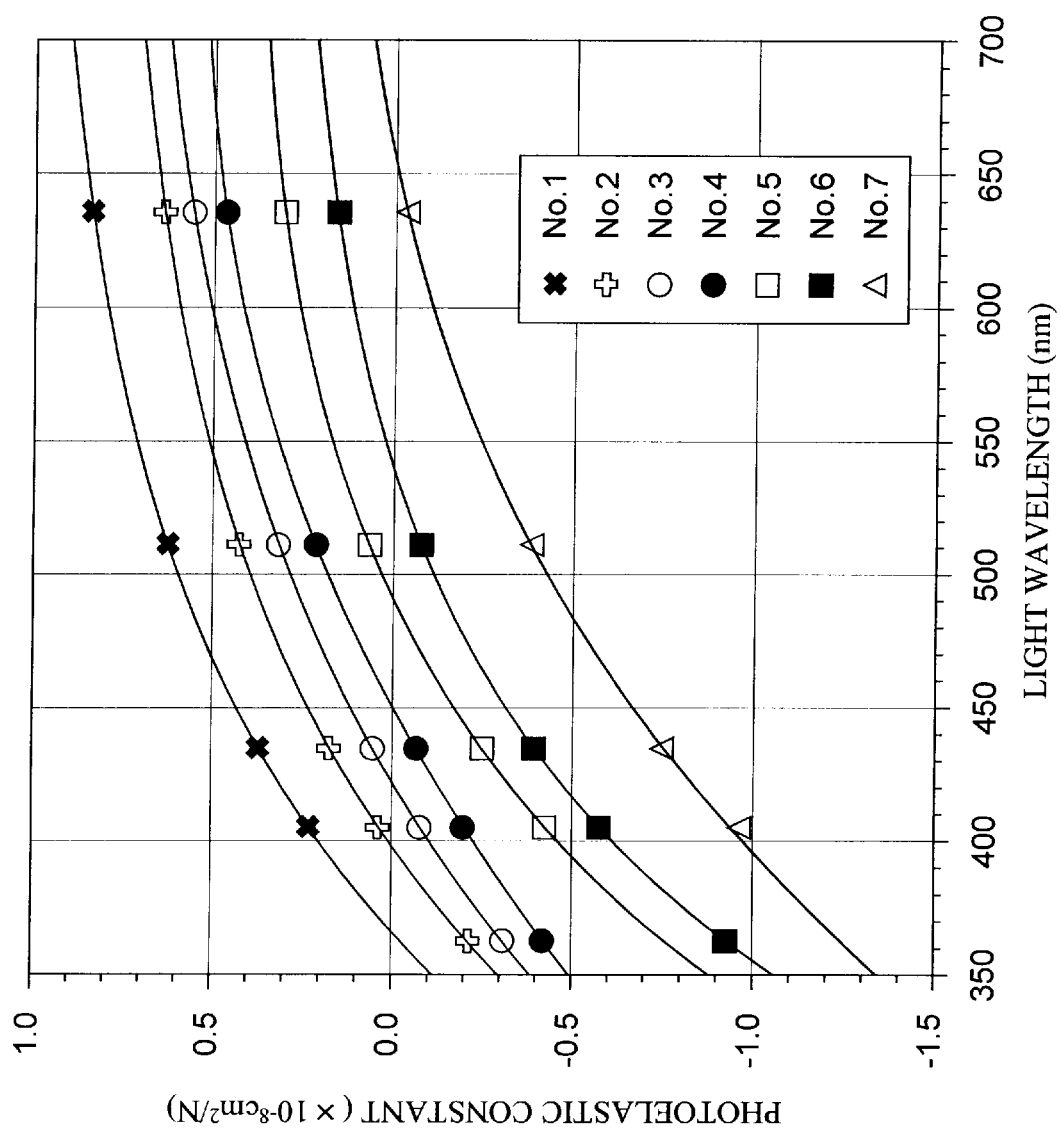
FIG. 4 is a graph showing the dependence of photoelastic constants of glass samples on wavelength.

FIG. 4 is a graph obtained as the results of the above-mentioned measurement and shows curves indicating the dependence of photoelastic constant C on wavelength in the respective samples No. 1 to No. 7 in the table of FIG. 2. Each of these curves is obtained when measured points concerning each sample is fitted to a cubic polynomial.

FIG. 4 has clarified the following. Namely, the photoelastic constant, as a function of wavelength, has a characteristic which is upward to the right while yielding an upward convex profile, whereby the longer the wavelength is, the lower becomes the rate at which the photoelastic constant increases.

As can be seen from FIG. 4, when glass is configured so that the absolute value of photoelastic constant is minimized in the wavelength range of the B-light component as in the case of samples No. 2 to No. 5, due to the above-mentioned characteristic, the absolute value of photoelastic constant can be suppressed to $+1.5 \times 10^{-8}$ cm$^2$/N or less not only in the B-light component wavelength range (380 to 500 nm) but also in the G-light component wavelength range (500 to 600 nm) and the R-light component wavelength range (600 to 700 nm). Also, since the amount of light absorption becomes greater as the wavelength is shorter as mentioned above, generation of birefringence caused by heat upon absorption of the B-light component can be reduced as much as possible due to the fact that the absolute value of photoelastic constant is minimized in the B-light component wavelength range. Further, since the absolute value of photoelastic constant is not greater than $1.5 \times 10^{-8}$ cm$^2$/N, while the heat generation caused by light absorption is inherently low in the G-light component wavelength range and R-light component wavelength range, birefringence can fully be restrained from occurring.

Also, as can be seen from FIG. 4, though not so evident as in the cases of samples No. 2 to No. 5 in which the absolute value of photoelastic constant is minimized in the B-light component wavelength range; in the cases of samples No. 1 and No. 6, the absolute value of photoelastic constant is not greater than $1.5 \times 10^{-8}$ cm$^2$/N in each of the B-light component wavelength range, G-light component wavelength range, and R-light component wavelength range, while the absolute value of photoelastic constant in the B-light component wavelength range is not considerably large, whereby the generation of birefringence caused by heat upon absorption of the B-light component can sufficiently be reduced. In the case of sample No. 7, on the other hand, though the absolute value of photoelastic constant is not greater than $1.5 \times 10^{-8}$ cm$_2$/N in each of the B-light component wavelength range, G-light component wavelength range, and R-light component to wavelength range, it is considerably large in the B-light component wavelength range, whereby birefringence occurs due to the heat generated upon the B-light component absorption too much to be tolerated in the present invention. In the cases of samples No. 1 to No. 4, among a first value which is a mean value of absolute values of photoelastic constants with respect to individual wavelengths in the wavelength range of the R-light component (i.e., a value obtained when the definite integral from 600 nm to 700 nm of the absolute value of photoelastic constant as a function of wavelength (corresponding to the area of a part surrounded by a horizontal line on which the photoelastic constant is zero, a vertical line indicating a wavelength of 600 nm, a vertical line indicating a wavelength of 700 nm, and a curve indicating a photoelastic constant in FIG. 4) is divided by its wavelength width of 100 nm); a second value which is a mean value of absolute values of photoelastic constants with respect to individual wavelengths in the wavelength range of the G-light component (i.e., a value obtained when the definite integral from 500 nm to 600 nm of the absolute value of photoelastic constant as a function of wavelength (corresponding to the area of a part surrounded by the horizontal line on which the photoelastic constant is zero, a vertical line indicating a wavelength of 500 nm, the vertical line indicating a wavelength of 600 nm, and a curve indicating a photoelastic constant in FIG. 4) is divided by its wavelength width of 100 nm); and a third value which is a mean value of absolute values of photoelastic constants with respect to individual wavelengths in the wavelength range of the B-light component (i.e., a value obtained when the definite integral from 380 nm to 500 nm of the absolute value of photoelastic constant as a function of wavelength (corresponding to the area of a part surrounded by the horizontal line on which the photoelastic constant is zero, a vertical line indicating a wavelength of 380 nm, the vertical line indicating a wavelength of 500 nm, and a curve indicating a photoelastic constant in FIG. 4) is divided by its wavelength width of 120 nm); the third value concerning the B-light component wavelength range is the smallest. In the cases of samples No. 5 and No. 6, among the first, second, and third values, the second value concerning the G-light component wavelength range is the smallest. In the case of sample No. 7, among the first, second, and third values, the first value concerning the R-light component wavelength range is the smallest. Accordingly, it can be seen that, employable is an optically transparent material member in which, among the first, second, and third values, the second value concerning the G-light component wavelength range or the third value concerning the B-light component wavelength range is the smallest. In this case, when the photoelastic constant in the R-light component wavelength range is not greater than $+1.5 \times 10^{-8}$ cm$^2$/N, the characteristic shown in FIG. 4 is upward to the right, thus making the photoelastic constant in the B-light component wavelength range sufficiently small.

As can be seen from the foregoing explanation, in the first embodiment, the above-mentioned glass samples No. 1 to No. 6 are examples of optically transparent materials which can be employed as an optically transparent material member for constituting the polarizing beam splitters 14R, 14G, and 14B, whereas the above-mentioned glass sample No.7 is a comparative example.

Here, as can be seen from FIG. 3, in order to minimize the absolute value of photoelastic constant in the B-light component wavelength range, the PbO content in the above mentioned composition range should be set within the range of 71 wt % to 73.7 wt %. optically transparent materials within such a composition range are examples of those which can be employed for constituting the polarizing beam splitters 14R, 14G, and 14B in this embodiment.

In the first embodiment, polarizing beam splitters constituted by optical members made of an optically transparent material is employed as polarizing beam splitters 14R, 14G, and 14B without using the above-mentioned conventional liquid immersion type polarizing beam splitter. Accordingly, in this embodiment, various problems accompanying the use of the above-mentioned conventional liquid immersion type polarizing beam splitter, such as convection, dust, bubble, and the like, can be eliminated, whereby the manufacture of the apparatus can advantageously be facilitated, for example.

Also, in the first embodiment, since polarizing beam splitters constituted by optical members made of the above-mentioned optically transparent material are employed as the polarizing beam splitters 14R, 14G, and 14B, while the same optically transparent material is used therein, generation of birefringence can be alleviated with respect to influences of various thermal and external stresses, in view of the thermal stress caused by light absorption in particular, so as to secure optically stable performances and suppress image quality deterioration such as chromatic unevenness. Further, as the same optically transparent material can be employed in the polarizing beam splitters 14R, 14G, and 14B, their cost can be lowered.

Embodiment 2

In the following, the second embodiment of the projection type display apparatus according to the present invention will be explained with reference to FIG. 5.

Figure 5:
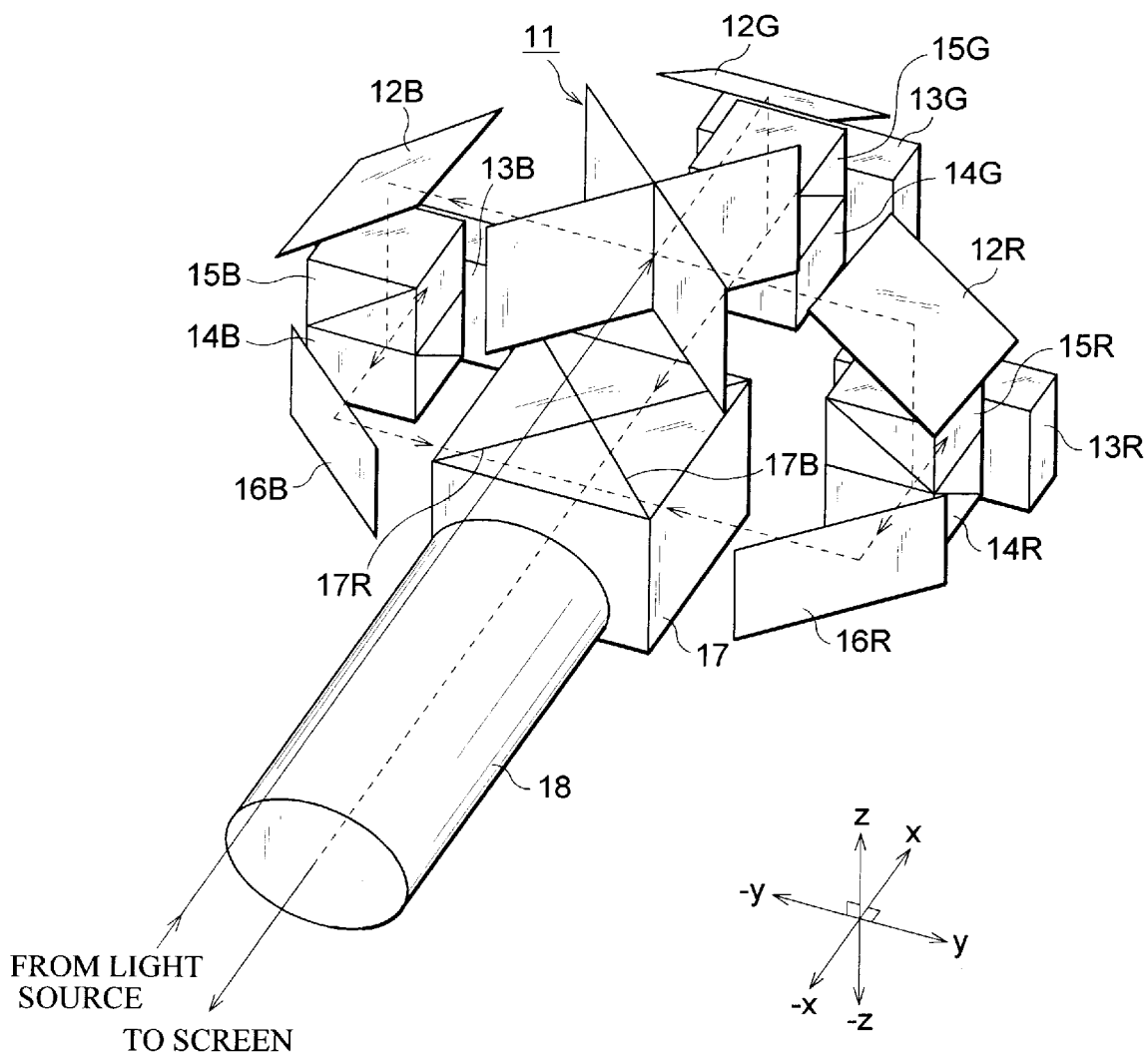
FIG. 5 is a view schematically showing the configuration of the second embodiment of the projection type display apparatus according to the present invention.

FIG. 5 is a perspective view showing a schematic configuration of the second embodiment of the projection type display apparatus according to the present invention. In FIG. 5, constituents identical or equivalent to those in FIG. 1 will be referred to with marks identical to those indicating the same, without their explanations being repeated.

The projection type display apparatus according to the second embodiment differs from that of the first embodiment shown in FIG. 1 only in that polarizing beam splitters 15R, 15G, and 15B are additionally disposed between the bending mirrors 12R, 12G, and 12B and the polarizing beam splitters 14R, 14G, and 14B, respectively. While the polarizing beam splitters 14R, 14G, and 14B serve as both polarized light separating optical systems for separating, in terms of polarization, the color-separated light components of respective colors and analyzing optical systems for analyzing the respective light beams modulated by the light valves 13R, 13G, and 13B in the first embodiment; the polarizing beam splitters 14R, 14G, and 14B merely constitute the analyzing optical systems, and the polarizing beam splitters 15R, 15G, and 15B constitute the polarized light separating optical systems in the second embodiment. Namely, in the second embodiment, the color light components separated by the cross dichroic mirror 11 are respectively made incident on the polarizing beam splitters 15R, 15G, and 15B by way of their corresponding bending mirrors 12R, 12G, and 12B; and polarized light components, on one side alone, of the respective color light components are transmitted through the polarizing beam splitters 15R, 15G, and 15B along Z axis so as to be made incident on their corresponding polarizing beam splitters 14R, 14G, and 14B as s-polarized light components, which are then made incident on the corresponding light valves 13R, 13G, and 13B. The subsequent operations are the same as those in the first embodiment.

In the second embodiment, each of the polarizing beam splitters 14R, 14G, 14B, 15R, 15G, and 15B is constituted by an optical member made of the optically transparent material employed in the polarizing beam splitters 14R, 14G, and 14B in the first embodiment (hereinafter referred to as "specific optically transparent material"). Accordingly, advantages similar to those in the first embodiment can be attained in the second embodiment as well.

Here, preferred is a case, as with the second embodiment, where each of the polarizing beam splitters 14R, 14G, 14B, 15R, 15G, and 15B is constituted by an optical member made of the specific optically transparent material, since it can strongly prevent the image quality from deteriorating. Nevertheless, in the present invention, only the polarizing beam splitters 14R, 14G, and 14B may be constituted by the optical members made of the specific optically transparent material, while the polarizing beam splitters 15R, 15G, and 15B are constituted by optical members made of a conventional optically transparent material, or vice versa.

Embodiment 3

In the following, the third embodiment of the projection type display apparatus according to the present invention will be explained with reference to FIG. 6.

Figure 6:
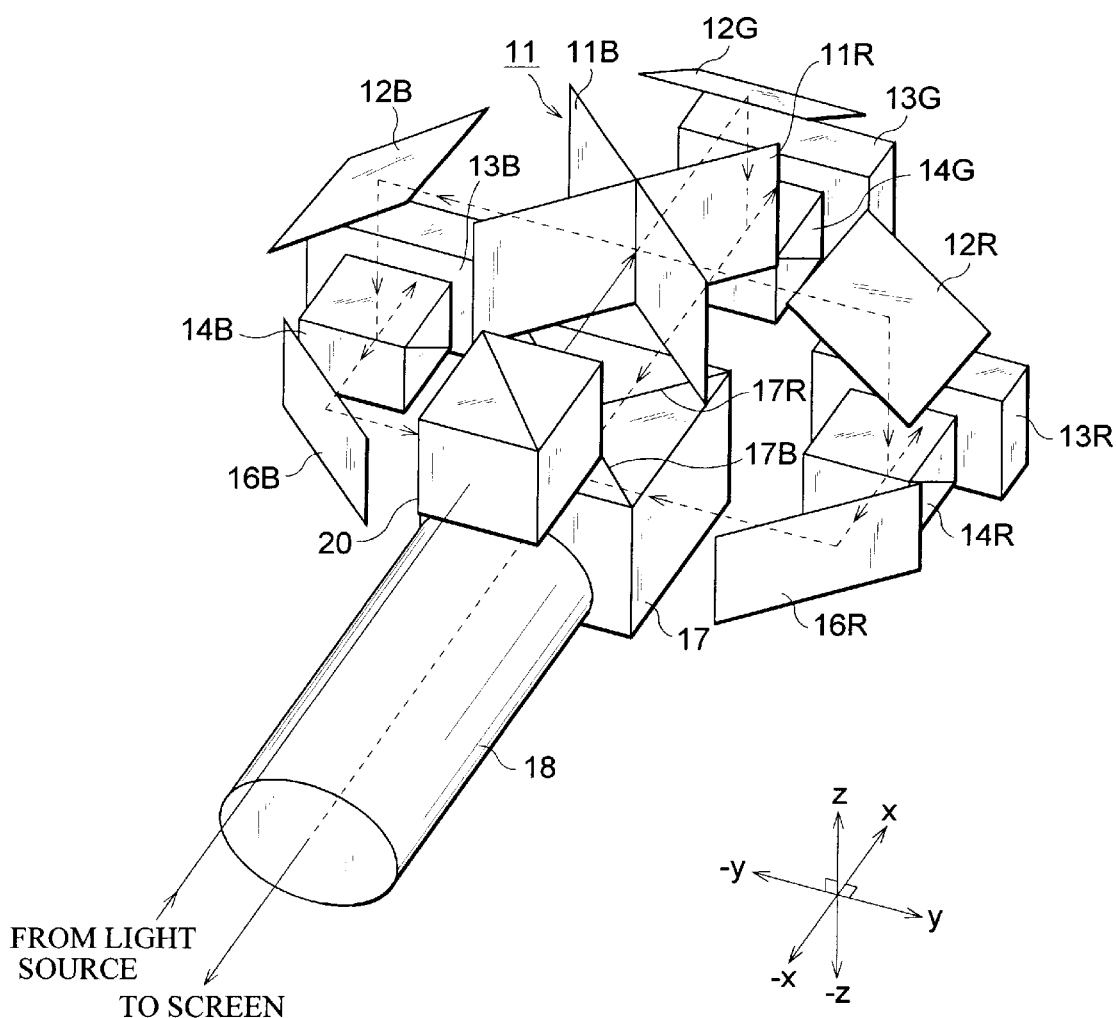
FIG. 6 is a view schematically showing the configuration of the third embodiment of the projection type display apparatus according to the present invention.

FIG. 6 is a perspective view showing a schematic configuration of the third embodiment of the projection type display apparatus according to the present invention. In FIG. 6, constituents identical or equivalent to those in FIG. 1 will be referred to with marks identical to those indicating the same, without their explanations being repeated.

The projection type display apparatus according to the third embodiment differs from that of the first embodiment shown in FIG. 1 only in that, upstream the cross dichroic mirror 11 as the color separating optical system, a polarizing beam splitter 20 is disposed as a polarized light separating optical system for separating light from the light source into two polarized light components before color separation. While the polarizing beam splitters 14R, 14G, and 14B serve as both polarized light separating optical system and analyzing optical system in the first embodiment, they do not serve as the polarized light separating optical systems in the third embodiment. In this embodiment, the light from the light source is separated into two polarized light components by the polarizing beam splitter 20, and one of the polarized light components is separated into individual color light components by the cross dichroic mirror 11. The polarized light components of respective colors thus separated (s-polarized light components with respect to the polarizing beam splitters 14R, 14G, and 14B) are made incident on the polarizing beam splitters 14R, 14G, and 14B, and then onto their corresponding light valves 13R, 13G, and 13B. The subsequent operations are the same as those in the first embodiment.

In the third embodiment, each of the polarizing beam splitters 14R, 14G, 14B, and 20 is constituted by an optical member made of the specific optically transparent material. Accordingly, advantages similar to those in the first embodiment can be attained in the third embodiment as well.

Here, preferred is a case, as with the third embodiment, where each of the polarizing beam splitters 14R, 14G, 14B, and 20 is constituted by an optical member made of the specific optically transparent material, since it can strongly prevent the image quality from deteriorating. Nevertheless, in the present invention, only the polarizing beam splitters 14R, 14G, and 14B may be constituted by the optical members made of the specific optically transparent material, while the polarizing beam splitter 20 is constituted by an optical member made of a conventional optically transparent material, or vice versa.

Embodiment 4

In the following, the fourth embodiment of the projection type display apparatus according to the present invention will be explained with reference to FIG. 7.

Figure 7:
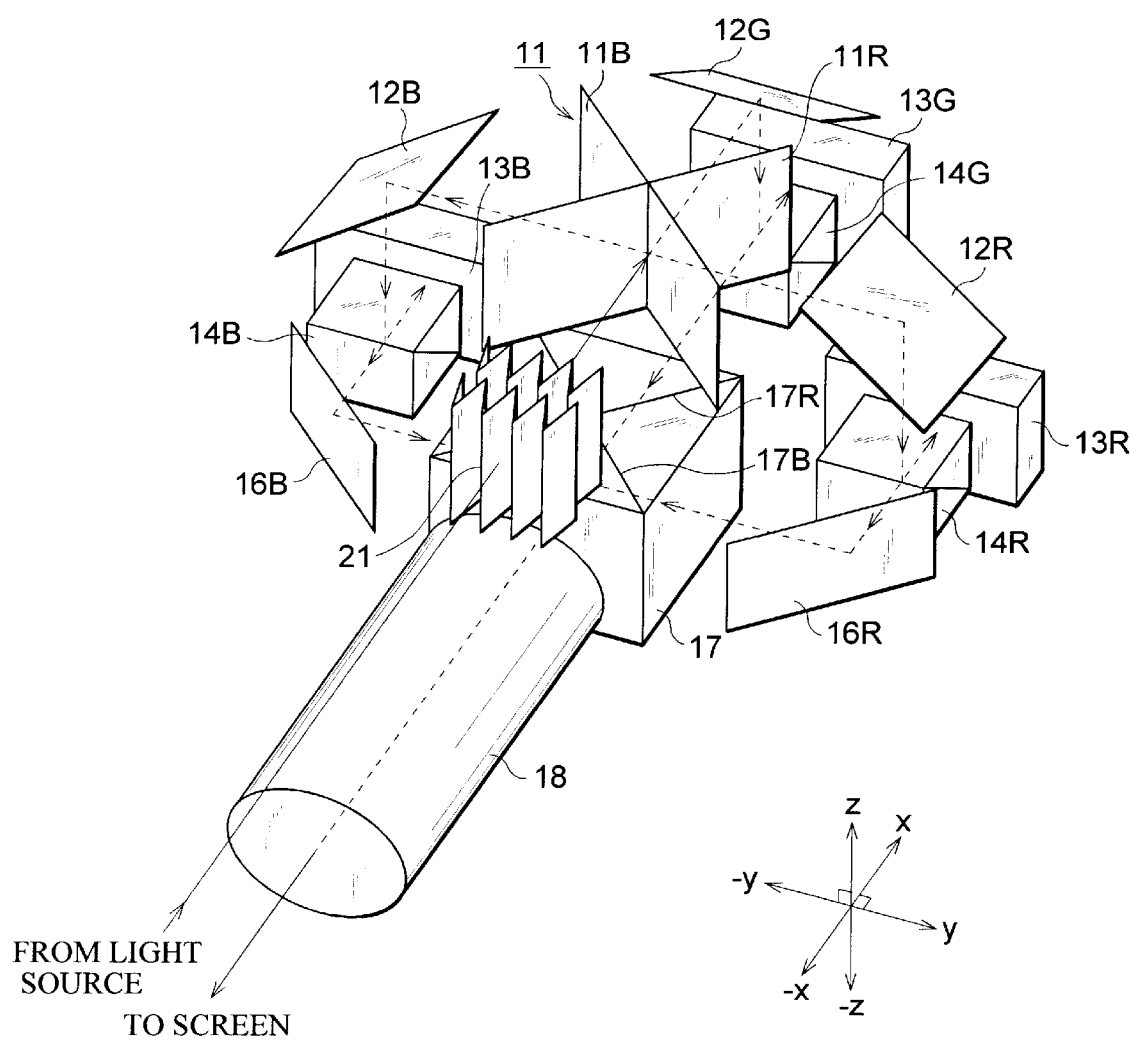
FIG. 7 a view schematically showing the configuration of the fourth embodiment of the projection type display apparatus according to the present invention.

FIG. 7 is a perspective view showing a schematic configuration of the fourth embodiment of the projection type display apparatus according to the present invention. In FIG. 7, constituents identical or equivalent to those in FIG. 1 will be referred to with marks identical to those indicating the same, without their explanations being repeated.

The projection type display apparatus according to the fourth embodiment differs from that of the first embodiment shown in FIG. 1 only in that, upstream the cross dichroic mirror 11 as the color separating optical system, a bellows-shaped polarizer 21 such as that disclosed in Japanese Patent Application Laid-Open No. 5-157915 is disposed as a polarized light separating optical system for separating light from the light source into two polarized light components before color separation. While the polarizing beam splitters 14R, 14G, and 14B serve as both polarized light separating optical system and analyzing optical system in the first embodiment, they do not serve as the polarized light separating optical systems in the fourth embodiment. In this embodiment, the light from the light source is separated into two polarized light components by the polarizer 21, and one of the polarized light components is separated into individual color light components (R-, G-, and B-light components) by the cross dichroic mirror 11. The polarized light components of respective colors thus separated (s-polarized light components with respect to the polarizing beam splitters 14R, 14G, and 14B) are made incident on the polarizing beam splitters 14R, 14G, and 14B, and then onto their corresponding light valves 13R, 13G, and 13B. The subsequent operations are the same as those in the first embodiment.

In the fourth embodiment, each of the polarizing beam splitters 14R, 14G, and 14B is constituted by an optical member made of the specific optically transparent material. Accordingly, advantages similar to those in the first embodiment can be attained in the fourth embodiment as well.

As explained in the foregoing, each of the respective polarizing beam splitters for R-, G-, and B-light components is constituted by an optical member made of an optically transparent material (specific optically transparent material) in which a wavelength where the absolute value of photoelastic constant becomes a minimum level, i.e., where the photoelastic constant is substantially nullified, exists in the wavelength range of the B-light component (in the first aspect). Accordingly, as mentioned above, the optically transparent material has a characteristic in which the photoelastic constant, as a function of wavelength, is upward to the right while yielding an upward convex profile. Consequently, though the photoelastic constant is relatively larger for the R- and G-light components than for the B-light component, it can be made sufficiently small with respect to each of the colors. As mentioned above, since light absorption becomes greater as the wavelength is shorter, the light absorption is maximized with respect to the B-light component, thus yielding the largest amount of internal stress upon light absorption. Nevertheless, since the photoelastic constant attains its minimum level in the B-light component wavelength range, generation of birefringence caused by light absorption with respect to the B-light component can sufficiently be suppressed. With respect to the R- and G-light components, on the other hand, since light absorption is inherently low, generation of birefringence caused by light absorption can sufficiently be suppressed even when the photoelastic constant is greater than that in the case of B-light component.

Consequently, in the optically transparent material of the first aspect, while the same optically transparent material is used in the polarizing beam splitters for the respective colors, generation of birefringence can be alleviated with respect to influences of various thermal and external stresses, so as to secure optically stable performances and suppress image quality deterioration. Further, as the same optically transparent material can be thus employed in the polarizing beam splitters for respective colors, their cost can be lowered, as compared with the case where different optically transparent materials are respectively used for the polarizing beam splitters of different colors.

Also, each of the polarizing beam splitters for R-, G-, and B-light components may be constituted by an optical member made of an optically transparent material (specific optically transparent material) in which, among a first value which is a mean value of absolute values of photoelastic constants with respect to individual wavelengths in the wavelength range of the R-light component, a second value which is a mean value of absolute values of photoelastic constants with respect to individual wavelengths in the wavelength range of the G-light component, and a third value which is a mean value of absolute values of photoelastic constants with respect to individual wavelengths in the wavelength range of the B-light component, the second or third value is the smallest (second aspect). In this case, when the optically transparent material in which the third value is the smallest of all is used, the absolute value of the mean photoelastic constant is consequently minimized with respect to the B-light component for which light absorption is the strongest and the amount of internal stress generated upon light absorption is the largest. Therefore, as with the optically transparent material of the first aspect, generation of birefringence upon light absorption with respect to the B-light component can sufficiently be suppressed. Also, with respect to the R- and G-light components, for which light absorption is inherently low, generation of birefringence upon light absorption can sufficiently be suppressed even when the mean photoelastic constant is greater than that in the case of B-light component. When the optically transparent material in which the second value is the smallest of all is used, on the other hand, the absolute value of the mean photoelastic constant is consequently minimized with respect to the G-light component. In this case, since the optically transparent material has a characteristic in which the photoelastic constant, as a function of wavelength, is upward to the right as mentioned above, the photoelastic constant with respect to the B-light component can be suppressed to a considerably low level though it may be relatively large. With respect to the R-light component, for which light absorption is inherently low, generation of birefringence upon light absorption can sufficiently be suppressed even when the mean photoelastic constant is large. Accordingly, even in the case employing an optically transparent material in which the second value is the smallest of all, when the projection type display apparatus has a relatively small quantity of incident light, generation of birefringence upon light absorption can sufficiently be suppressed with respect to each color light component. Here, in the case employing an optically transparent material in which the first value is the smallest of all, the photoelastic constant with respect to the B-light component becomes considerably large, whereby it cannot be suppressed to a small level.

Accordingly, also in the optically transparent material of the second aspect, while the same optically transparent material is used for the polarizing beam splitters for the respective colors, generation of birefringence can be alleviated with respect to influences of various thermal and external stresses, so as to secure optically stable performances and suppress image quality deterioration. Also, as the same optically transparent material can be thus employed in the polarizing beam splitters for respective colors, their cost can be lowered, as compared with the case where different optically transparent materials are respectively used for the polarizing beam splitters of different-colors.

The present invention should not be restricted to the above-mentioned embodiments.

For example, while the projection type display apparatus according to each of the above-mentioned embodiments exemplifies a single projection lens type projection display apparatus in which individual color light components (R-, G-, and B-light components) are combined together in terms of color beforehand so that an image is projected by a single projection lens, the present invention is also applicable to a three projection lens type projection display apparatus in which the respective color light components (R-, G-, and B-light components) are respectively projected by three projection lenses onto a screen, on which they are combined together in terms of color.

As explained in the foregoing, according to the present invention, no liquid is used, whereby problems accompanying the use of the above-mentioned liquid immersion type polarizing beam splitter can be eliminated, whereby the manufacture of the apparatus can advantageously be facilitated, for example. Also, it is possible to provide a projection type display apparatus which can secure optically stable performances against influences of various thermal and external stresses and in which image quality deterioration is small.

Embodiment 5

Figure 8:
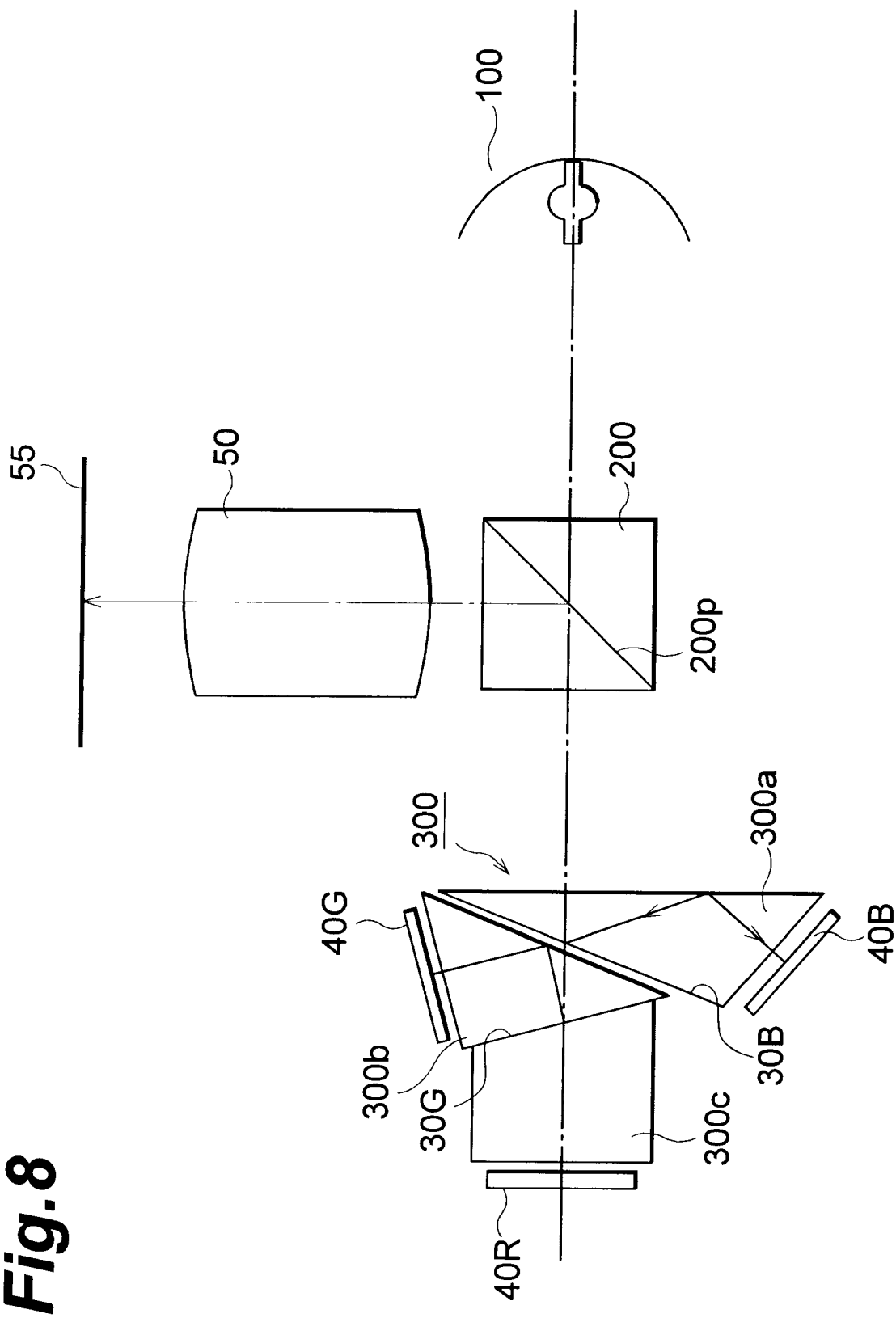
FIG. 8 is a view schematically showing the configuration of the fifth embodiment of the projection type display apparatus according to the present invention.

In the following, a fifth embodiment of the projection type display apparatus according to the present invention will be explained with reference to FIG. 8. FIG. 8 is a view schematically showing the configuration of the fifth embodiment of the projection type display apparatus according to the present invention.

The apparatus according to the fifth embodiment has a light source 100 comprising a lump and a concave mirror such as an ellipse mirror or the like. The concave mirror is arranged at a rear side of the lump. The source light emitted from the light source 100 travels through an infrared-cut filter and an ultraviolet-cut filter in order, and thereafter the source light is formed into substantially parallel light beam by a forming optical system. The parallel light beam is made incident on a polarizing beam splitter 200 and separated into a s-polarized light component (reflection component) and a p-polarized light component (passing component) by a beam splitting surface 200P of the polarizing beam splitter.

The p-polarized light component separated by the polarizing beam splitter 200 is guided to a color separating/combining optical system. The color separating/combining optical system is a color separating/combining prism body 300 comprising prism assemblies 300a, 300b, and 300c. The prism body 300 is so-called philips type color separating/combining prism.

In the color separating/combining prism body 300, an air gap exists between the prism assemblies 300a and 300b, and a dichroic film 30B for reflecting the B-light component is formed on a surface of the prism assembly 300a, the surface opposing the prism assembly 300b. Further, the prism assemblies 300b and 300c are bonded while sandwiching a dichroic film 30G for reflecting the G-light component.

By the above-mentioned configuration, the B-light component within the p-polarized light component incident on the prism assembly 300a travels such that it is reflected by the dichroic film 30B, totally reflected by an incident surface of the prism assembly 300a, and reaches an emission surface of the prism assembly 300a (see FIG. 8). The light component emitted from the emission surface of the prism assembly 300a is guide to a light valve 40B for the B-light component disposed near the emission surface of the prism assembly 300a.

On the other hand, a mixture light of R- and G-light components which pass through the dichroic film 30B is made incident on the prism assembly 300b through the air gap. The incident mixture light is separated into the G-light component (reflection component) and R-light component (passing component) by the dichroic film 30G. The dichroic film 30G is positioned at a bonding portion between the prism assemblies 300b and 300c.

The G-light component reflected by the dichroic film 30G travels through the prism assembly 300b and is totally reflected by a surface of the prism assembly 300b, the surface forming the air gap together with the prism assembly 300a. The reflected G-light component is emitted from an emission surface of the prism assembly 300b and is guided to a light valve 40G for the G-light component, the modulator 40G being provided near the emission surface of the prism assembly 300b. On the other hand, the R-light component passing through the dichroic film 30G travels through the prism assembly 300c and is emitted from an emission surface of the prism assembly 300c, and thereafter the emitted R-light component is made incident on a light valve 40R for the R-light component.

When the above light valves 40B, 40G, and 40R are respectively optically writing type modulators, a p-light component of each of the incident color components is changed so as to become a s-polarized light component at an incident position. By contrary, when these ligth valves 40B, 40G, and 40R are respectively electric writing type light valves, the p-polarized light component incident on the position selected by switching is changed so as to become a s-polarized light component by the above function, and the changed light component and non-selected and unchanged light components are emitted as a mixture light from each of the light valves 40B, 40G, and 40R set for the associated color components (R-, G-, and B-light components).

The R-light component emitted from the light valve 40R is emitted from the prism body 300 by passing through the prism assemblies 300b and 300c in order, and is made incident on the polarizing beam splitter 200. The G-light component emitted from the light valve 40G is made incident on the prism assembly 300b, and is totally reflected at a slant surface constituting the air gap together with the prism assembly 300a. Further, the G-light component is made incident on the polarizing beam splitter 200 through the air gap and the prism assembly 300a after it is reflected by the dichroic film 30G. The B-light component emitted from the light valve 40B is totally reflected by a slant surface of the prism assembly 300a and further reflected by the dichroic film 30B, thereby being made incident on the polarizing beam splitter 200.

As described above, the color components (including R-, G-, and B-light components) emitted from the associated light valves 40R, 40G, and 40B are combined by the prism body 300 comprising the prism assemblies 300a, 300b, and 300c.

Sequentially, the mixture light of the modulated light (s-polarized light component) and the non-modulated light is made incident on the polarizing beam splitter 200. The mixture light incident on the polarizing beam splitter 200 is separated into s- and p-polarized light components by the beam splitter surface 200P of the polarizing beam splitter 200. In other words, the s-polarized light component is analyzed by the polarizing beam splitter 200. The analyzed s-polarized light component is guided to a projection optical system 5 (including a lens) and is projected as a color image on a screen 55. On the other hand, the p-polarized light component passing through the polarizing beam splitter 200 is discarded.

In the fifth embodiment, the polarizing beam splitter 200 and the prism assemblies 300a–300c constituting the prism body 300 are respectively characterized by being made of an optically transparent material in which a wavelength where an absolute value of a photoelastic constant becomes a minimum level exists in a wavelength range of at least one of the blue light component and the green light component.

Also, these members 200, 300a–300c may be respectively made of an optically transparent material in which, among a first value which is a mean value of absolute values of photoelastic constants with respect to individual wavelengths in a wavelength range of the red light component, a second value which is a mean value of absolute values of photoelastic constants with respect to individual wavelengths in a wavelength range of the green light component, and a third value which is a mean value of absolute values of photoelastic constants with respect to individual wavelengths in a wavelength range of the blue light component, said second or third value is the smallest.

Further, in the fifth embodiment, the s-polarized light component within the source light incident on the polarizing beam splitter 200 is reflected by the beam splitting surface 200P of the polarizing beam splitter 200. However, the embodiment, of course, allows a configuration such that the s-polarized light component to be reflected is guided to the color separating/combining optical system. As applying thus configuration, the s-polarized light components as the color components is guided to the associated light valves, and the modulated light components become to be p-polarized light components. Therefore, the modulated light that is made incident on and analyzed by the polarizing beam splitter 200, of the color-combined light, becomes to be a p-polarized light component, and the projection optical system 5 (lens) are disposed at a position where a transparent light from the polarizing beam splitter 200 passes through.

The above-mentioned fifth embodiment can remove various problems of the conventional polarizing beam splitter and color separating/combining optical system of liquid immersion type, and can make its fabrication become easy.

Further, the above-mentioned fifth embodiment has remarkable effects being capable of securing optically stable performances against influences of various thermal and external stresses and suppressing image quality deterioration to a low level because the above-mentioned optically transparent member is applied to the polarizing beam splitter 200 and the prism body 300 of the color separating/combining optical system as an optical material for an optically transparent prism.

Embodiment 6

Figure 9:
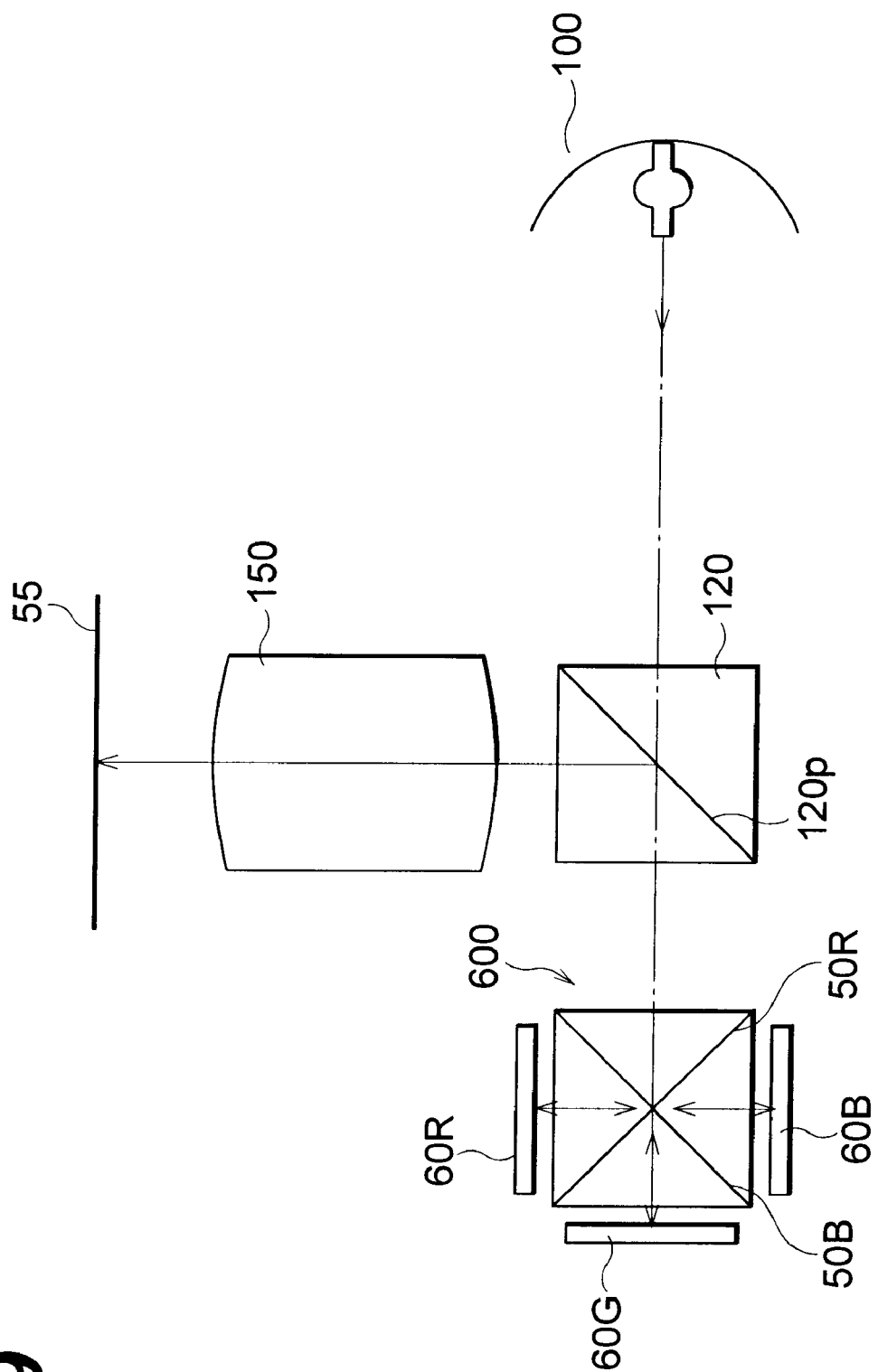
FIG. 9 is a view schematically showing the configuration of the sixth embodiment of the projection type display apparatus according to the present invention.

In the following, a sixth embodiment of the projection type display apparatus according to the present invention will be explained with reference to FIG. 9. FIG. 9 is a view schematically showing the configuration of the sixth embodiment of the projection type display apparatus according to the present invention.

In the above-mentioned fifth embodiment, the color separating/combining optical system is a philips type prism constituted by arranging a plurality of prism assemblies 300a–300c with dichroic films at predetermined positions. However, in the projection type display apparatus according to this sixth embodiment, a cross dichroic prism is applied to the color separating/combining optical system.

In the apparatus of the sixth embodiment, a source light from a light source 100 comprising a lump and a concave mirror such as a ellipse mirror or the like is changed to a parallel light beam by a forming optical system, and the parallel light beam is made incident on a polarizing beam splitter 120 having a beam splitting surface 120P. The incident source light is separated into a s-polarized light component (reflection component to be discarded) and a p-polarized light component (passing component). The p-polarized light component emitted from the polarizing beam splitter 120 is made incident on a cross dichroic prism 400 as the above-mentioned color separating/combining optical system.

The cross dichroic prism 400 is configured such that assemblies of optically transparent prisms each having a same rectangular equilateral triangular prism form. Each of the prism assemblies has a dichroic film on a slant surface thereof, and the cross dichroic prism 400 is a prism body produced by bonding their rectangular portions while butting together. By the configuration, a dichroic film 50R for reflecting the R-light component and a dichroic film 50B for reflecting the B-light component are interposed between their butting surfaces so as to be placed in X form.

The p-polarized light component from the polarizing beam splitter 120 is made incident on the cross dichroic prism 400 and is separated into R-, G-, and B-light components traveling along optical axes orthogonal to each other.

Reflection type light valves 60R, 60G, and 60B, as spacial light modulators prepared in accordance with the separated color components (R-, G-, and B-light components), are respectively arranged near associated emitting surfaces of the cross dichroic prism 400.

Here, the prepared spacial light valves are optically writing type or electric writing type reflection light valves as in the case of the fifth embodiment.

A mixture light of the modulated light (s-polarized light component) from the light valves 60R, 60G, and 60B and the p-polarized light component as an non-modulated light is made incident on the cross dichroic prism 400 again, and the color components of the modulated light are combined by reflection/passing functions of the cross dichroic prism 400. The combined light is emitted from the cross dichroic prism 400 toward the polarizing beam splitter 120.

The combined light incident on the polarizing beam splitter 120 is analyzed by the beam splitting surface 120 P of the polarizing beam splitter 120, thereby the s-polarized light component as a modulated light is reflected and projected on a screen 55 through a projection optical system 150. On the other hand, the p-polarized light component as an non-modulated light passes through the beam splitting surface 120P of the polarizing beam splitter 120 and is discarded by traveling toward the light source 100.

Also, in the sixth embodiment, an optically transparent material, which is utilized in the fifth embodiment, is applied to prism assemblies as optically transparent members constituting the polarizing beam splitter 120 and the cross dichroic prism 400. Therefore, the sixth embodiment can obtain a merit as in the case of the fifth embodiment, and the same effect can be established.

As described above, the present invention can provide a projection type display apparatus being capable of securing optically stable performances against influences of various thermal and external stresses and suppressing image quality deterioration to a low level because of utilizing a polarizing beam splitter and/or a color separating/combining optical system, each being constituted by an optically transparent material block having a specific characteristic.

Embodiment 7

As mentioned above, in the projection type display apparatus according to fifth embodiment (FIG. 8), each of the polarizing beam splitter and color separating/combining complex prism is constituted by optical glass prism members. Consequently, due to their large volumes, the polarizing beam splitter and color separating/combining complex prism increase their own weights, and necessitate a large space for their installation. Hence, the resulting projection type display apparatus becomes greater and heavier, thus hindering its portability.

Therefore, the invention according to the seventh embodiment reduces the dimensions of the above-mentioned optical glass prism members, thereby providing a projection type display apparatus which is excellent in portability.

Figure 10:
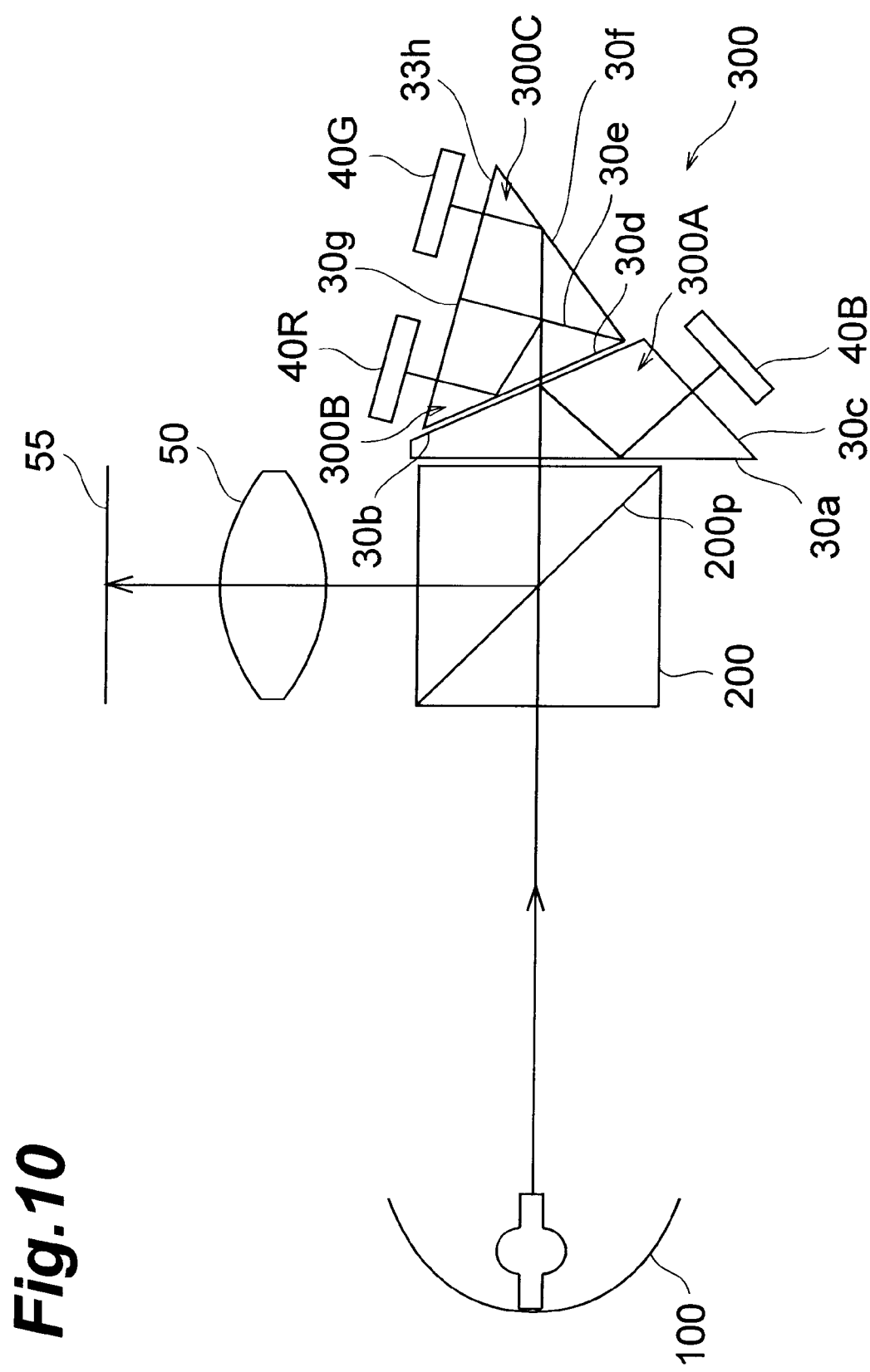
FIG. 10 is a view schematically showing the configuration of the seventh embodiment of the projection type display apparatus according to the present invention.

FIG. 10 is a view showing the configuration of the seventh embodiment of the projection type display apparatus according to the present invention. In FIG. 10, the color separating/combining prism body 300 is constituted by a first prism member 300A, a second prism member 300B, and a third prism member 300C. A dichroic film having a B-light reflecting characteristic is formed on a surface 30b of the first prism member 300A. Further, an air gap of several tens of microns exists between the surface 30b and a surface 30d of the second prism member 300B.

The second prism member 300B and the third prism member 300C have substantially the same form. At the bonded surface 30e between the second prism member 300B and the third prism member 300C, a dichroic film having an R-light reflecting characteristic is formed on one of the surfaces of the second and third prism members. The second prism member 300B and the third prism member 300C are configured so as to be bonded and secured to each other by an optical adhesive. Namely, the second prism member 300B and the third prism member 300C are symmetrical to each other about the surface 30e. Such a configuration of the second prism member 300B and third prism member 300C can reduce the manufacturing cost. Here, it is not always necessary for the second prism member 300B and third prism member 300C to have identical forms.

A substantially parallel luminous flux emitted from a light source 100 constituted by a lamp and a concave mirror formed like a parabolic mirror is made incident on the polarizing beam splitter 200. The luminous flux incident on the polarizing beam splitter 200 is polarization-separated into a p-polarized light component transmitted through a polarization separating portion 200p and an s-polarized light component reflected by the polarization separating portion 200p. The s-polarized light component is discarded as unnecessary light.

The p-polarized light component transmitted through the polarization separating portion 200p of the polarizing beam splitter 200 is made incident on the first prism member 300A from its entrance surface 30a. Of the incident light (p-polarized light component), the B-light reflecting dichroic film disposed at the surface 30b reflects the B-light component and transmits therethrough the R- and G-light components, thereby chromatically decomposing the incident light.

Thus chromatically separated B-light component (the color component reflected by the B-light reflecting dichroic film) travels through the first prism member 300A and is totally reflected by the entrance surface 30a. Thus totally reflected B-light component is emitted from an exit surface 30c.

The R- and G-light components emitted from the surface 30b of the first prism member 300A are made incident on the surface 30d of the second prism member 300B by way of the air gap. The light incident on the second prism member 300B travels as it is, and reaches the bonded surface 30e. Of the light that has reached there, the R-light reflecting dichroic film formed at the bonded surface 30e reflects the R-light component and transmits therethrough the G-light component, thereby chromatically decomposing the light.

The R-light component reflected by the R-light reflecting dichroic film formed at the bonded surface 30e travels through the second prism member 300B. Then, the R-light component totally reflected by the surface 30d travels through the prism member 300B again and is emitted from a surface 30g.

The G-light component transmitted through the surface 30e of the second prism member 300B travels through the third prism member 300C and reaches a surface 30f. This G-light component is totally reflected by the surface 30f and then travels through the third prism member 300C again, so as to be emitted from a surface 30h.

Light valves 40R, 40B, and 40G are reflection type liquid crystal light valves, each of which has a large number of pixels and functions to convert the p-polarized light component incident on a part corresponding to a pixel selected by a respective color signal into the s-polarized light component and reflecting and emitting the resulting light component. The luminous flux reflected by each light valve 40R, 40B, 40G is emitted from the surface 30a of the first prism member 300A as mixture light made of the modulated light component (s-polarized light component) corresponding to the selected part and the unmodulated light component (p-polarized light component) corresponding to the unselected part.

The respective color components reflected by the light valves 40R, 40B, and 40G travel in the directions opposite to the above-mentioned incident light. Namely, the G-light component is reflected by the surface 30f of the third prism member 300C and then, by way of the bonded surface 30e, the surface 30d of the second prism member 300B, and the surface 30b of the first prism member 300A, is emitted from the surface 30a toward the polarizing beam splitter 200. The R-light component is reflected by the surface 30d of the second prism member 300B and then, by way of the bonded surface 30e, the surface 30d of the second prism member 300B, and the surface 30b of the first prism member 300A, is emitted from the surface 30a toward the polarizing beam splitter 200. The B-light component is totally reflected by the surface 30a of the first prism member 300A and then, by way of the surface 30b, is emitted from the surface 30a.

As explained in the foregoing, the prism body 300 also functions as a color combining optical system, thereby chromatically combining the respecting color is components from the light valves 40R, 40G, and 40B.

The composite light from the prism body 300 is made incident on the polarizing beam splitter 200. Of this incident light, the s-polarized light, which is modulated light, is reflected by the polarization separating portion 200p, whereas the p-polarized light component, which is unmodulated light, is transmitted therethrough as it is and then is discarded toward the light source.

The reflected light, which is analyzed light, is made incident on a projection lens 50 and is projected onto a screen 55 as a full-color image.

As explained in the foregoing, in the projection type apparatus of the seventh embodiment, the prism members constituting the color separating/combining complex prism body 300 are such that not only the first and second prism members 300A and 300B but also the third prism member 300C has a triangular prism form, whereby a lighter weight can be achieved as compared with the projection type display apparatus according to the fifth embodiment (FIG. 8) in which the third prism member 300c (see FIG. 8) is substantially an irregular quadrangular prism. Namely, as the light traveling through the third prism member 300C is totally reflected therein, a same optical path length as R- and B-light components can be gained in the third prism member 300C, whereby the third prism member 300C can be made smaller than that in the fifth embodiment shown in FIG. 8.

Preferably, in the projection type display apparatus of the seventh embodiment shown in FIG. 10, each of the prism members used for the polarizing beam splitter 200 and color separating/combining prism body 300 is made of the above-mentioned transparent glass member (see FIGS. 2 to 4).

The seventh embodiment is concerned with a polarized light component which travels through these optical members made of transparent glass, so as to be made incident on and reflected by the light valves, and then travels through the same optical members again so as to be projected. This embodiment aims at taking out the polarized light component corresponding to necessary modulated light therefrom, projecting it onto the screen, and improving the contrast of thus projected light. Hence, if the state of polarization changes upon transmission through the optical members, then its aimed object cannot be fulfilled.

For example, BK7 or the like, which is known as a typical optical glass material, may generate birefringence therewithin due to the mechanical stress generated when the member is being secured or due to the thermal stress caused by changes in ambient temperature, whereby the state of polarization of the passing polarized light may change.

In view of the above-mentioned problem, the seventh embodiment uses a material having a photoelastic constant C whose absolute value is not greater than $+1.5 \times 10^{-8}$ cm$^2$/N with respect to light in the optical wavelength region employed (light traveling through the prism members).

Here, the wavelength to minimize absolute value of photoelastic constant in FIG. 2 refers to the values of wavelength indicating substantially zero in the photoelastic constants having the respective characteristics shown in FIG. 4.

All these materials can set the above-mentioned absolute value of photoelastic constant to $+1.5 \times 10^{-8}$ cm$^2$/N or less throughout the blue to red wavelength regions. As a consequence, even if a mechanical stress occurs or a thermal stress is generated upon changes in ambient temperature, the birefringence generated within the glass material will be suppressed to such an extent that it is not influential. Therefore, as with each of the above-mentioned embodiments, the above-mentioned optical materials are optimal materials for the polarizing beam splitter 200 and color separating/combining prism body 300 of the projection type display apparatus according to the seventh embodiment (FIG. 10). In this embodiment, the optically transparent glass material of sample No. 6 in the graph shown in FIG. 4, having a refractive index of 1.849, is employed as the glass material for the polarizing beam splitter 200 and color separating/combining prism body 300. However, it is not necessary for the material to be restricted to this sample, as a matter of course.

The conventionally well-known BK7 material mentioned above exhibits approximately $2.7 \times 10^{-8}$ cm$^2$/N as the value of the above-mentioned photoelastic constant C. Not only this material but also other optically transparent glass materials having an absolute value of photoelastic constant C not smaller than $+1.5 \times 10^{-8}$ cm$^2$/N yield greater birefringence, whereby the polarized light passing therethrough would be changed by this birefringence, which is unfavorable.

As described above, the projection apparatus according to the seventh embodiment uses the above-mentioned glass material having a photoelastic constant with a small absolute value which is not greater than a predetermined value, since the linearly polarized light component derived from the light source light traveling by way of the polarizing beam splitter 200 is the light that is subjected to color separation and color combination by means of prisms and dichroic films constituting the complex prism body 300. Therefore, changes in the state of polarization can also be minimized when the light is transmitted through the prism members of the polarizing beam splitter and complex prism. As a consequence, the image projected onto the screen can be prevented from lowering its contrast.

In thus configured projection type display apparatus according to the seventh embodiment, in addition to the minimizing of changes in the state of polarization transmitted through the prism, attention must be paid to the changes in state of polarization upon reflection and transmission at the dichroic film on the surface 30*b* of the first prism member 300A and the dichroic film formed at the bonded surface 30*e* between the second prism member 300B and the third prism member 300C in the color separating/combining complex prism 300. It is due to the fact that, even if the above-mentioned transparent member having a small photoelastic constant is used for the above-mentioned polarizing beam splitter 200 and the prism body 300 constituting the color separating/combining complex prism, the projected image will lower its contrast when the state of polarization changes as the light travels by way of the dichroic films.

This problem may be solved by a method in which the state of polarization of light changing upon reflection or transmission by a dichroic film is compensated for by reflection or transmission by a total reflection plate or another dichroic film as disclosed in Japanese Patent Application Laid-Open No. 6-175123.

In the above-mentioned apparatus according to the seventh embodiment, the change in state of polarization in the B-light component reflected by the dichroic film on the surface 30*b* of the first prism member 300A can be compensated for by total reflection at the surface 30*a* of the first prism member 300A. As for the R-light component reflected by the dichroic film between the second prism member 300B and the third prism member 300C, its change in state of polarization upon the transmission through the above-mentioned B-light reflecting dichroic film and reflection by this R-light reflecting dichroic film is compensated for by the total reflection at the surface 30*d*. As for the G-light component, its change in state of polarization upon the transmission through the above-mentioned B-light reflecting dichroic film and R-light reflecting dichroic film can be compensated for by the total reflection at the surface 30*f*.

More specifically, as for the B-light component reflected by the B-light reflecting dichroic film on the surface 30*b*, the change in state of polarization caused by this reflection is compensated for by the total reflection at the surface 30*a*. The change in state of polarization of the B-light component emitted from the surface 30*c* is compensated for so as to yield elliptically polarized light whose major axis lies in a direction parallel to the paper surface on the light valve 40B.

The R-light component incident on the second prism member 300B to be reflected by the R-light reflecting dichroic film on the surface 30*e* passes through the above-mentioned B-light reflecting dichroic film and then is reflected by the R-light reflecting dichroic film. The change in state of polarization caused by reflection and transmission at such dichroic films is compensated for by the total reflection at the surface 30*d*. The change in state of polarization is compensated for so as to yield elliptically polarized light whose major axis lies in a direction parallel to the paper surface on the light valve 40R.

As for the G-light component transmitted through the B-light reflecting dichroic film and R-light reflecting dichroic film, the change in state of polarization due to the effects of individual films is compensated for by the total reflection at the surface 30*f*, and yields elliptically polarized light whose major axis lies in a direction parallel to the paper surface on the light valve 40G.

When the three light valves are in their OFF state (i.e., black state), the individual color light components in the above-mentioned polarization states go back along the paths leading to their corresponding light valves. Here, the individual color light components are transmitted through their corresponding dichroic films, so as to be transmitted from the surface 30a of the first prism member 300A as mixed light toward the polarizing beam splitter 200. This mixed light becomes a p-polarized light component which is linearly polarized light ideal for being transmitted through the polarization separation portion 200p of the polarizing beam splitter 200 and has a direction of vibration corresponding thereto. Thus, since the seventh embodiment can employ a configuration which provides a total reflection effect before light is made incident on light valves, it is effective in that the change in state of polarization caused by dichroic films can be compensated for in any of the R-, B-, and G-light components. Here, it is desirable that a dielectric film or the like be formed on the above-mentioned total reflection surfaces as disclosed in Japanese Patent Application Laid-Open No. 6-175123 in order to compensate for the changes in state of polarization.

The projection type display apparatus according to the fifth embodiment (FIG. 8) cannot always compensate for the change in state of polarization upon transmission through two dichroic films in the transmitted G-light component in particular, whereby the projected image may lower its contrast.

In the seventh embodiment, the prism body 300, the first prism member 300A, the second prism member 300B, the third prism member 300C, the B-light reflecting dichroic film formed on the surface 30b of the first prism member 300A, and the R-light reflecting dichroic film formed on the bonded surface 30e between the second prism member 300B and the third prism member 300C constitute the color separating/combining complex prism, the first prism assembly, the second prism assembly, the third prism assembly, the first color-reflecting dichroic film, and the second color-reflecting dichroic film, respectively.

As explained in the foregoing, the seventh embodiment is effective in that the prism members used in the color separating/combining prism can be made smaller, whereby a lighter weight can be achieved. In addition, in the seventh embodiment, each color light component can be subjected to a total reflection effect in each prism member before being made incident on a light valve. This total reflection effect can compensate for the change in state of polarization upon reflection or transmission by dichroic films. Hence, this embodiment can also be effective in improving the contrast of the projected image.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 7-072372 filed on Mar. 6, 1995, No. 7-168298 filed on Jun. 9, 1995, No. 8-075343 filed on Mar. 5, 1996, No. 8-312978 filed on Nov. 9, 1996, No. 9-295914 filed on Oct. 28, 1997 and No. 10-280166 filed on Oct. 1, 1998, and U.S. application Ser. No. 08/993,528 filed on Dec. 18, 1997, now pending and U.S. Pat. No. 5,808,795 are hereby incorporated by reference.

What is claimed is:

1. A projection type display apparatus comprising:
a color combining optical system provided so as to combine, in terms of color, red, green, and blue light components respectively incident thereon and emit a combined light;
a polarizing beam splitter provided so as to separate the combined light from said color combining optical system and analyze a predetermined polarized light component from the combined light; and
a projection optical system provided so as to project an analyzed light from said polarizing beam splitter to a screen;
wherein said color combining optical system includes an optical member made of an optically transparent material whose photoelastic constant has an absolute value of no greater than $1.5 \times 10^{-8}$ cm$^2$/N with respect to the light components incident on said color combining optical system.

2. A projection type display apparatus according to claim 1, wherein said polarizing beam splitter includes an optical member made of an optically transparent material whose photoelastic constant has an absolute value of no greater than $1.5 \times 10^{-8}$ cm$^2$/N with respect to the light components incident on said polarizing beam splitter.

3. A projection type display apparatus comprising:
a polarized light separating optical system provided so as to separate light from a light source into first and second polarized light components different from each other;
a color separating optical system provided so as to separate one of the first and second polarized light components into red, green, and blue light components;
light valves prepared in accordance with the light components separated by said color separating optical system, each of said light valves modulating an associated light component within the light components separated by said color separating optical system;
a color combining optical system provided so as to combine, in terms of color, the light components respectively modified by said associated light valves;
an analyzing optical system provided so as to analyze a combined light from said color combining optical system; and
a projection optical system provided so as to project an analyzed light from said analyzing optical system;
wherein said color separating optical system and said color combining optical system are commonly constituted by a plurality of prism assemblies, each of said plurality of prism assemblies made of a respective optical member made of an optically transparent material whose photoelastic constant has an absolute value of no greater than $1.5 \times 10^{-8}$ cm$^2$/N with respect to the light components incident on said color combining optical system.

4. A projection type display apparatus according to claim 3, said polarized light separating optical system and said analyzing optical system are commonly constituted by a polarizing beam splitter, said polarizing beam splitter including an optical member made of an optically transparent material whose photoelastic constant has an absolute value of no greater than $1.5 \times 10^{-8}$ cm$^2$/N with respect to the light components incident on said color combining optical system.

5. A projection type display apparatus comprising:
a color combining optical system provided so as to combine, in terms of color, red, green, and blue light components respectively incident thereon and emit a combined light;
a polarizing beam splitter provided so as to separate the combined light from said color combining optical system and analyze a predetermined polarized light component from the combined light; and a projection optical system provided so as to project an analyzed light from said polarizing beam splitter to a screen;

wherein said color combining optical system includes an optical member made of an optically transparent material in which a wavelength where an absolute value of a photoelastic constant becomes a minimum level exists in a wavelength range of at least one of the blue light component and the green light component.

6. A projection type display apparatus according to claim 5, wherein said polarizing beam splitter includes an optical member made of an optically transparent material in which a wavelength where an absolute value of a photoelastic constant becomes a minimum level exists in a wavelength range of at least one of the blue light component and the green light component.

7. A projection type display apparatus comprising:

a color combining optical system provided so as to combine, in terms of color, red, green, and blue light components respectively incident thereon and emit a combined light;

a polarizing beam splitter provided so as to separate the combined light from said color combining optical system and analyze a predetermined polarized light component from the combined light; and a projection optical system provided so as to project an analyzed light from said polarizing beam splitter to a screen;

wherein said color combining optical system includes an optical member made of an optically transparent material in which, among a first value which is a mean value of absolute values of photoelastic constants with respect to individual wavelengths in a wavelength range of the red light component, a second value which is a mean value of absolute values of photoelastic constants with respect to individual wavelengths in a wavelength range of the green light component, and a third value which is a mean value of absolute values of photoelastic constants with respect to individual wavelengths in a wavelength range of the blue light component, one of said second and third value is the smallest.

8. A projection type display apparatus according to claim 7, wherein said polarizing beam splitter includes an optical member made of an optically transparent material in which, among said first, second, and third values, said second or third value is the smallest.

9. A projection type display apparatus comprising:

a polarized light separating optical system provided so as to separate light from a light source into first and second polarized light components different from each other;

a color separating optical system provided so as to separate one of the first and second polarized light components into red, green, and blue light components;

light valves prepared in accordance with the light components separated by said color separating optical system, each of said light valves modulating an associated light component within the light components separated by said color separating optical system;

a color combining optical system provided so as to combine, in terms of color, the light components respectively modified by said associated light valves;

an analyzing optical system provided so as to analyze a combined light from said color combining optical system; and a projection optical system provided so as to project an analyzed light from said analyzing optical system;

wherein said color separating optical system and said color combining optical system are commonly constituted by a plurality of prism assemblies, and wherein each of said plurality of prism assemblies includes a respective optical member made of an optically transparent material in which a wavelength where an absolute value of a photoelastic constant becomes a minimum level exists in a wavelength range of at least one of the blue light component and the green light component.

10. A projection type display apparatus according to claim 9, wherein said polarized light separating optical system and said analyzing optical system are commonly constituted by a polarizing beam splitter, and wherein said polarizing beam splitter includes an optical member made of an optically transparent material in which a wavelength where an absolute value of a photoelastic constant becomes a minimum level exists in a wavelength range of at least one of the blue light component and the green light component.

11. A projection type display apparatus comprising:

a polarized light separating optical system provided so as to separate light from a light source into first and second polarized light components different from each other;

a color separating optical system provided so as to separate one of the first and second polarized light components into red, green, and blue light components;

light valves prepared in accordance with the light components separated by said color separating optical system, each of said light valves modulating an associated light component within the light components separated by said color separating optical system;

a color combining optical system provided so as to combine, in terms of color, the light components respectively modified by said associated light valves;

an analyzing optical system provided so as to analyze a combined light from said color combining optical system; and a projection optical system for projecting an analyzed light from said analyzing optical system;

wherein said color separating optical system and said color combining optical system are commonly constituted by a plurality of prism assemblies, and wherein each of said plurality of prism assemblies includes a respective optical member made of an optically transparent material in which, among a first value which is a mean value of absolute values of photoelastic constants with respect to individual wavelengths in a wavelength range of the red light component, a second value which is a mean value of absolute values of photoelastic constants with respect to individual wavelengths in a wavelength range of the green light component, and a third value which is a mean value of absolute values of photoelastic constants with respect to individual wavelengths in a wavelength range of the blue light component, one of said second and third value is the smallest.

12. A projection type display apparatus according to claim 11, wherein said polarized light separating optical system and said analyzing optical system are commonly constituted by a polarizing beam splitter, and wherein said polarizing beam splitter includes an optical member made of an optically transparent material in which, among said first, second, and third values, one of said second and third value is the smallest.

* * * * *